(12) United States Patent
Koito et al.

(10) Patent No.: US 12,153,313 B2
(45) Date of Patent: Nov. 26, 2024

(54) DISPLAY DEVICE

(71) Applicant: Japan Display Inc., Tokyo (JP)

(72) Inventors: Takeo Koito, Tokyo (JP); Junji Kobashi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/460,784

(22) Filed: Sep. 5, 2023

(65) Prior Publication Data

US 2023/0408877 A1  Dec. 21, 2023

Related U.S. Application Data

(63) Continuation of application No. PCT/JP2022/005084, filed on Feb. 9, 2022.

(30) Foreign Application Priority Data

Mar. 5, 2021  (JP) .................. 2021-035349

(51) Int. Cl.
| | |
|---|---|
| G02F 1/1347 | (2006.01) |
| G02F 1/13 | (2006.01) |
| G02F 1/1335 | (2006.01) |
| G02F 1/13363 | (2006.01) |
| G02F 1/29 | (2006.01) |

(52) U.S. Cl.
CPC .......... *G02F 1/1347* (2013.01); *G02F 1/1323* (2013.01); *G02F 1/133536* (2013.01); *G02F 1/13363* (2013.01); *G02F 1/29* (2013.01); *G02F 1/292* (2013.01)

(58) Field of Classification Search
CPC ........... G02F 1/1323; G02F 1/29; G02F 1/292
See application file for complete search history.

(56) References Cited

U.S. PATENT DOCUMENTS

| | | | |
|---|---|---|---|
| 2012/0188467 A1* | 7/2012 | Escuti .................. | G02F 1/1347 349/1 |
| 2013/0050452 A1* | 2/2013 | Ramsey ............... | H04N 13/305 348/58 |

(Continued)

FOREIGN PATENT DOCUMENTS

| | | |
|---|---|---|
| JP | 2006-018485 A | 1/2006 |
| JP | 2011-209436 A | 10/2011 |

OTHER PUBLICATIONS

International Search Report issued on May 10, 2022 in corresponding application No. PCT/JP2022/005084; 4 pages.

*Primary Examiner* — Alexander P Gross
(74) *Attorney, Agent, or Firm* — Maier & Maier, PLLC

(57) ABSTRACT

The display device includes an image display panel emitting linearly polarized light from a display area, a retardation plate on the image display panel, a variable phase difference element located on the retardation plate and providing phase difference to an incoming light, and a liquid crystal diffraction element on the variable phase difference element. The variable phase difference element is switchable between an on state, an off state, and an intermediate state, and the phase change of the intermediate state is smaller than the phase change of the on state. A first emission direction of a first emitted light in the on state, a second emission direction of a second emitted light in the off state, and a third emission direction of a third emitted light in the intermediate state are different from each other.

9 Claims, 21 Drawing Sheets

(56) References Cited

U.S. PATENT DOCUMENTS

2015/0247617 A1\* 9/2015 Du .................... G02F 1/133603
362/19
2021/0048674 A1 2/2021 Yan et al.

\* cited by examiner

DISPLAY DEVICE

CROSS-REFERENCE TO RELATED APPLICATIONS

This application is a Continuation of International Patent Application No. PCT/JP2022/005084, filed on Feb. 9, 2022, which claims the benefit of priority to Japanese Patent Application No. 2021-035349, filed on Mar. 5, 2021, the entire contents of which are incorporated herein by reference.

FIELD

An embodiment of the present invention relates to a display device capable of controlling the viewing angle.

BACKGROUND

In recent years, there has been a growing need to control viewing angles in display devices for in-vehicle and mobile devices. In display devices for in-vehicle use, there is a need for the driver not to be concerned about the display device, while the passenger in the front passenger seat wants to enjoy the entertainment images. In addition, in display devices for mobile devices, there is a need for a function to prevent voyeurism.

Patent Literature 1 (Japanese laid-open patent publication No. 2006-18485) discloses a display device that allows the driver and the front seat passenger to view different displays. In the display device, a light-shielding zone is arranged between adjacent pixels of a liquid crystal display. In the liquid crystal display, one of the adjacent pixels is the pixel to be displayed on the left side and the other is the pixel to be displayed on the right side. For example, this allows the display device to control the viewing angle by outputting an image for the pixel to be displayed on the left side and a black image for the pixel to be displayed on the right side.

Patent Literature 2 (Japanese laid-open patent publication No. 2011-209436) discloses a stereoscopic display device having a display unit that time-division displays images for the left eye and images for the right eye for stereoscopic viewing, a backlight, and a light ray direction control element positioned between the backlight and the display unit. The light ray direction control element synchronizes with the time-divisional display in the display section and deflects the light from the backlight in two alternating directions so that stereoscopic viewing is possible, thereby reducing resolution degradation.

SUMMARY

A display device according to an embodiment of the present invention includes an image display panel emitting linearly polarized light from a display area, a retardation plate on the image display panel, a variable phase difference element located on the retardation plate and providing phase difference to an incoming light, and a liquid crystal diffraction element on the variable phase difference element.

A display device according to an embodiment of the present invention includes a lighting device, a liquid crystal diffraction element arranged on the lighting device, a first retardation plate arranged on the liquid crystal diffraction element, a first variable phase difference element arranged on the first retardation plate to provide phase difference to an incoming light, and an image display panel arranged on the first variable phase difference element.

A display device according to an embodiment of the present invention includes an image display panel, a louver film arranged on the image display panel, a liquid crystal diffraction element arranged on the louver film, a first retardation plate arranged on the liquid crystal diffraction element, a variable phase difference element arranged on the first retardation plate to provide phase difference to an incoming light, and a first polarizing plate arranged on the image display panel.

DESCRIPTION OF EMBODIMENTS

Figure 1:
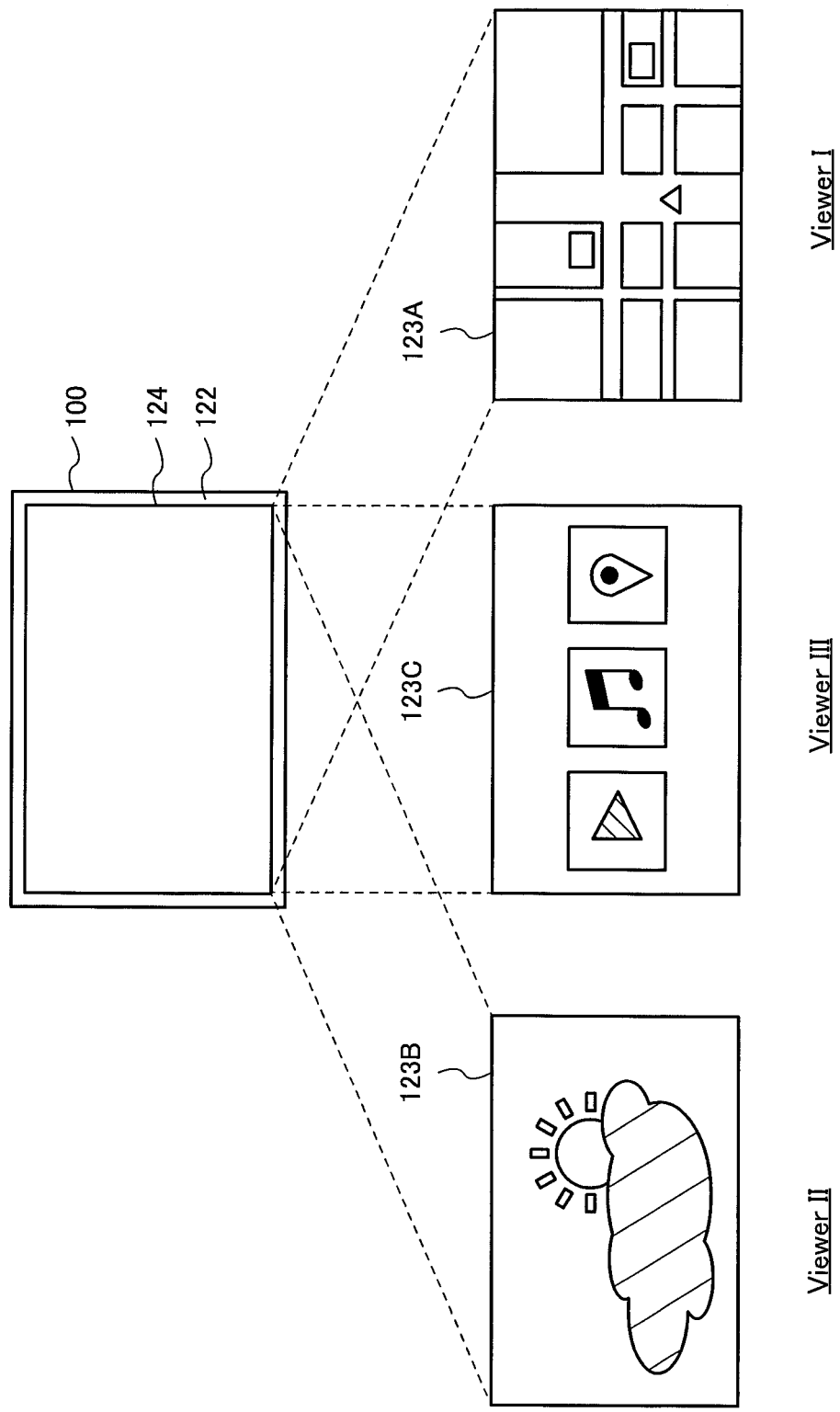
FIG. 1 is an overview of a display device according to an embodiment of the present invention.

Patent Literature 1 separates pixels in the display area into those for display on the driver seat side and those for display on the passenger seat side. As a result, the resolution is degraded compared to the case where all pixels are viewed from one direction. In addition, the luminance is degraded by the light-shielding zone between adjacent pixels. Time-divisional-driven stereoscopic displays such as those described in Patent Literature 2 often cause problems in the manufacturing process, such as low yields and difficulty in improving the characteristics.

An embodiment of the present invention discloses a display device with a controlled viewing angle without degradation of resolution.

Each embodiment of the present invention will be described below with reference to the drawings and other materials. However, the invention can be implemented in various forms to the extent that it does not depart from the gist of the technical concept and is not to be construed as limited to the description of the embodiments illustrated below.

The drawings may be represented schematically in terms of width, thickness, shape, and the like of each part in comparison with the actual state in order to make the description clearer, but this is only an example, and the shape itself shown in the illustration does not limit the interpretation of the invention. In the drawings, elements with the same functions as those described for the figures already mentioned in the specification may be marked with the same symbols even if they are different figures and redundant explanations may be omitted.

In expressing how other structures are placed on top of one structure, when the word "on" is used simply unless otherwise specified, it shall include both the case where another structure is placed directly above, in contact with one structure, and the case where another structure is placed above one structure through another structure further above the other structure.

In principle, in each embodiment of the invention, the direction in which light emitted from a light source is directed is described and illustrated as "up" or "above."

First Embodiment

A display device 100 according to an embodiment of the present invention will be described with reference to FIG. 1 to FIG. 9.
1. Overview of Display Device FIG. 1 illustrates an overview of a display device 100 according to an embodiment of the invention. The display device 100 displays images on a display area 124. A peripheral area 122 surrounds the display area 124. In FIG. 1, an image 123A is an example of an image seen from a viewer I, positioned in the front right side relative to the display device 100. An image 123B is an example of an image seen from a viewer II, positioned in the front left side relative to the display device 100. An image 123C is an example of an image seen from a viewer III, positioned directly in front of the display device 100.

The display device 100 can display a plurality of images corresponding to any of a plurality of viewing angles, for example, in a time-divisional manner. In the display device 100, the images 123A and 123B can be viewed differently from the other viewing angles according to their respective positions within the plurality of viewing angles. The display device 100 can also be configured so that the images 123A, 123B, and 123C can be viewed from different than the positions within the other viewing angles. Thus, the display device 100 can display the image 123A for the viewer I who is in front of the display device 100 to the right and the image 123B for a viewer II who is in front of the display device 100 to the left, which are different images. Alternatively, the display device 100 can display different images for the viewer I who is in front of the display device 100 on the right, for the viewer II who is in front of the display device 100 on the left, and for the viewer III who is directly in front of the display device 100.

The image 123A is the image corresponding to a first image source, the image 123B is the image corresponding to a second image source, and the image 123C is the image corresponding to a third image source. The first image source corresponds to the image displayed in the display area 124 for the first viewing angle (right front). The second image source corresponds to the image displayed in the display area 124 for a second viewing angle (left front) different from the first. The third image source corresponds to the image to be displayed in the display area 124 for a viewing angle between the first and second viewing angles. The display device 100 inputs a signal corresponding to the first image source, a signal corresponding to the second image source, or a signal corresponding to the third image source to the display area 124. The user selects which of the first image source, the second image source, or the third image source to be displayed in the display area 124 using a touch sensor arranged in the display area 124. The display device 100 displays the selected image source in the display area 124 at a viewing angle corresponding to the image source. In other words, the display device 100 can display the display image 123A in the first viewing angle (right front), the image 123B in the second viewing angle (left front), or the image 123C in the third viewing angle (front), depending on the selected image source.

For example, the display device 100 can be applied to an in-vehicle display. In this case, the first image source can be an image showing a map or route output from a navigation device. The second image source may be an entertainment image output from a DVD player or TV receiver. The third image source may be an information image. The display device 100 displays the image 123A of the first image source in the display area 124 at a first viewing angle in the direction of the driver seat. The display device 100 also displays the image 123B of the second image source in the display area 124 at a second viewing angle in the direction of the passenger seat. The display device 100 also displays the image 123C of the third image source to be displayed in the display area 124 at a third viewing angle in the direction between the driver seat and the passenger seat. This allows the viewer I in the driver seat to see the image 123A showing the map and route. The viewer II in the passenger seat can see the image 123B showing an entertainment image. Both the viewer I and the viewer II can see the information image 123C. In addition, viewer III in a rear seat can view image 123C.

The display device 100 can also switch between displaying the image 123A of the first image source, the image 123B of the second image source, and the image 123C of the third image source in the display area 124. In other words, when the image 123A of the first image source is selected by the user to be displayed in the display area 124, the image 123A of the first image source is displayed at the first viewing angle in the direction of the driver seat. If the image 123B of the second image source is selected by the user to be displayed in the display area 124, the image 123B of the second image source is displayed at a second viewing angle in the direction of the passenger seat. The display device 100 may display the image 123A of the first image source at the first viewing angle in the direction of the driver seat. The display device 100 may display the image 123A of the first image source at a third viewing angle in the direction between the driver seat and the front passenger seat. The corresponding relationship between the first image source to the third image source and the first direction 201 to the third direction 203 is an example and is not limited.

The structure of the display device 100 is described in detail hereafter.

2. Structure of the Display Device

Figure 2:
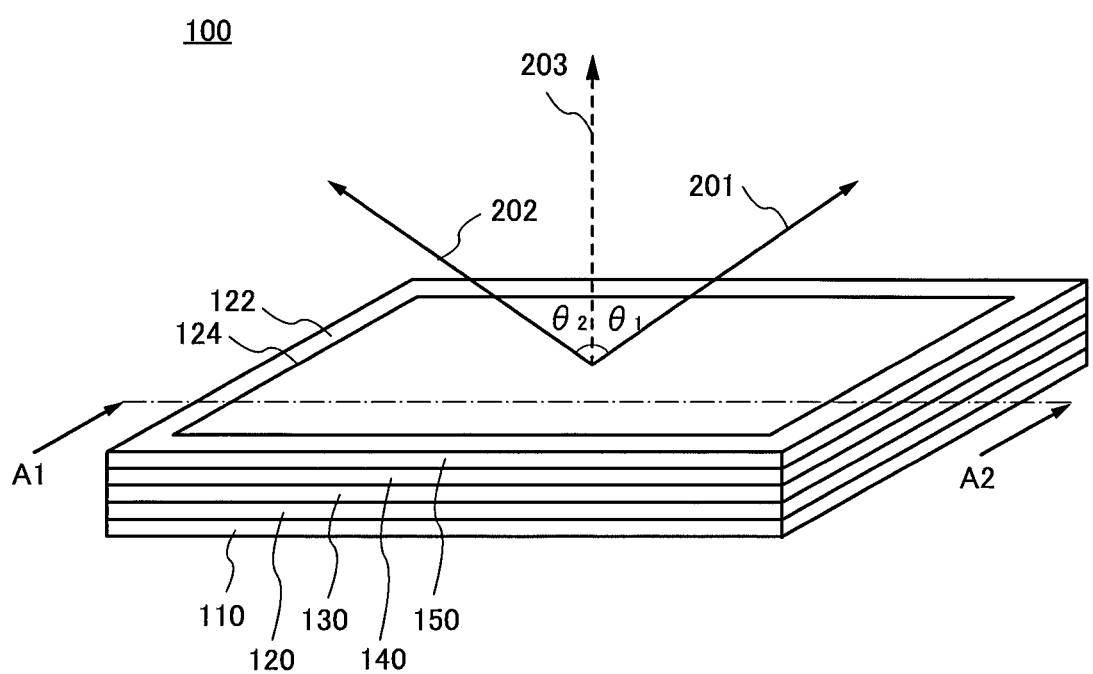
FIG. 2 is a perspective view of the display device according to an embodiment of the invention.
Figure 3:
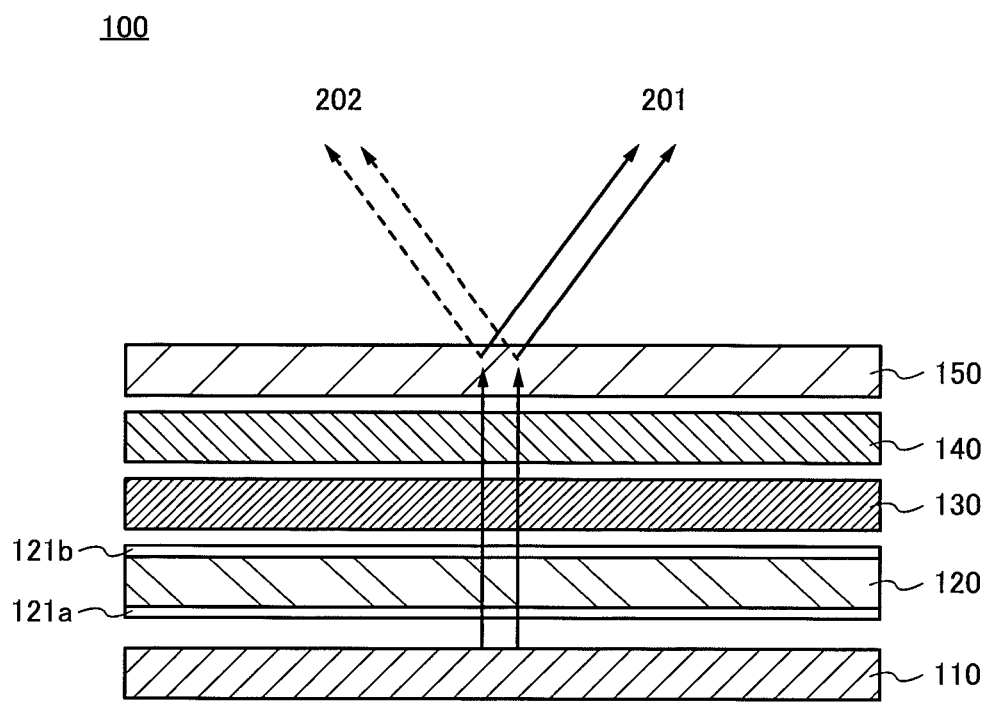
FIG. 3 is a cross-sectional view of the display device shown in FIG. 2 cut along a line A1-A2.

FIG. 2 is a diagram of the display device 100 according to an embodiment of the invention. FIG. 3 is a cross-sectional view of the display device 100 shown in FIG. 2 cut along a line A1-A2. The display device 100 has a lighting device 110, an image display panel 120, a retardation plate 130, a variable phase difference element 140, and a liquid crystal diffraction element 150. In the display device 100, the lighting device 110, the image display panel 120, the retardation plate 130, the variable phase difference element 140, and the liquid crystal diffraction element 150 are stacked in order from the bottom. Although not shown in the figure, a touch sensor may be arranged on the liquid crystal diffraction element 150.

The display device 100 displays different images for multiple directions on the display area 124. In this embodiment, the function of the display device 100 is to display different images in the display area 124 in three directions (left, right, and front). The case where an image is displayed on the right side with respect to the display area 124, the image is displayed in the first direction 201; when light is emitted on the left side, the image is displayed in the second direction 202; and when light is emitted in the center, the image is displayed in the third direction 203 will be described. The first direction 201 is an angle $\theta_1$ in the direction perpendicular to the display area 124 (the third direction 203), and the second direction 202 is an angle $\theta_2$ in the direction perpendicular to the display area 124. The angle $\theta_1$ should range from −30° to −90°, and the angle $\theta_2$ should range from +30° to +90°. In other words, the first viewing angle is −30° to −90° with respect to the direction perpendicular to the display area 124, the second viewing angle is +30° to +90° with respect to the direction perpendicular to the display area 124, the third viewing angle is suitably −30° to +30° with respect to the direction perpendicular to the display area 124. If the image is displayed in only two directions, the first direction 201 and the second direction 202, the angle $\theta_1$ should range from 0° to −90°, and the angle $\theta_2$ should range from 0° to +90°.

The lighting device 110 has the function of a backlight for the image display panel 120. Although not shown in detail, the lighting device 110 has, for example, a light source, a reflective sheet, a light guide plate, and a diffusion sheet. As the light source, for example, a light bulb, a fluorescent lamp, a cold cathode tube, a light emitting diode (LED), or a laser diode (LD) is used. It is preferable to use LEDs as the light source of the lighting device 110; lighting devices using LEDs have high luminance and low power consumption. Each LED, and LE includes an organic light-emitting diode (OLED) and an organic laser diode (OLD).

The light guide plate spreads the light emitted from the light source across the entire panel. The diffusion sheet diffuses the light spread over the entire panel by the light guide plate. The reflective sheet reflects the light emitted from the light source onto the image display panel for efficient use. The lighting device 110 emits an unpolarized light. A louver film may be placed on the lighting device 110. The louver film can be placed on the lighting device 110 to control the direction of travel of the light emitted from the lighting device 110 to a predetermined emission angle. This allows the direction of travel of light emitted from the lighting device 110 to be controlled.

A liquid crystal panel, an organic EL panel, a mini LED panel, or a micro LED panel is used as the image display panel 120. The image display panel 120 should emit linearly polarized light from the display area 124. Therefore, it is desirable to convert unpolarized light into linearly polarized light by attaching a polarizing plate to the image display panel 120. The louver film may be attached to the image display panel 120 overlapping the polarizing plate. In this embodiment, a liquid crystal panel is used as the image display panel. On both sides of the liquid crystal panel, polarizing plates 121a and 121b are attached with their absorption axes orthogonal to each other. This allows unpolarized light emitted from the lighting device 110 to be linearly polarized. The operating mode of the LCD panel can be used as appropriate, such as FFS mode, IPS mode, VA mode, or TN mode. In this embodiment, the case where the operating mode of the LCD panel is FFS mode will be described. When a self-luminous display panel such as an OLED panel, a mini LED panel, or a micro LED panel is applied as the image display panel 120, the lighting device 110 may be omitted. Furthermore, in an OLED panel, a mini LED panel, or a micro LED panel, a circular polarizing plate may be placed on the panel surface to prevent outside light from being reflected by the panel, and the circular polarizing plate may be used in combination with the polarizing plate described above.

The retardation plate 130 has the function of providing a phase difference to the light. In this embodiment, a quarter-wave plate is used as the retardation plate 130; the quarter-wave plate is a wave plate that provides a phase difference of ¼ wavelength to the incident light ray. When the slow axis of the quarter-wave plate overlaps on the absorption axis of the polarizing plate 121b at θ=45°, the light is right circularly polarized, and when it overlaps at θ=−45°, the light is left circularly polarized. If the light incident on the retardation plate 130 is right circularly polarized, the outgoing light from the retardation plate 130 will be linearly polarized light with θ=45°. If the incident light to the retardation plate 130 is left circularly polarized, the outgoing light from the retardation plate will be linearly polarized light of θ=−450.

The variable phase difference element 140 has a function of providing a phase difference to light. The variable phase difference element 140 has a function of switching between a phase difference of ½ wavelength and a phase difference of 0. The variable phase difference element 140 may have a function that can continuously change between a phase difference of ½ wavelength and a phase difference of 0.

For example, a liquid crystal panel can be used as the variable phase difference element 140 having such a function. The liquid crystal panel has a structure in which a liquid crystal layer is arranged between a first electrode on a first substrate and a second electrode on a second substrate. Here, the first electrode is arranged on an entire surface of the first substrate. The second electrode is arranged on an entire surface of the second substrate. The liquid crystal layer is configured to switch between a first state that substantially does not affect a polarization of the light passing through the interior and a second state that reverses a polarization of the light passing through the interior (i.e., converts the light to orthogonal polarization). The liquid crystal layer is a switchable birefringent liquid crystal layer that can be electrically switched between zero and half-wavelength delay in response to a voltage applied with relatively high precision and over a relatively wide bandwidth.

For example, the liquid crystal panel is used in the TN mode which is a structure in which the liquid crystal molecules are oriented in a 90° twist when no voltage is applied (hereafter referred to as the off state). Therefore, the phase is delayed by 180° in the way light enters and passes through the liquid crystal. When voltage is applied (hereinafter referred to as "on state"), the liquid crystal molecules are oriented in the direction in which the voltage is applied. In other words, the liquid crystal molecules are oriented perpendicular to the first and second electrodes. Therefore, the phase does not change (i.e., 0°) from the time light enters the liquid crystal until it is transmitted. Thus, the birefringence index of the liquid crystal changes with the application of voltage. Therefore, the phase difference of the variable phase difference element 140 can be controlled by using the change in the birefringent index of the liquid crystal. For example, an organic polymer material having an orientation such as nematic phase, smectic phase, cholesteric phase, or discotic phase is used as the material of the liquid crystal.

The liquid crystal diffraction element 150 polarizes and diffracts the incident light and emits light in at least two directions (the first direction 201 and the second direction 202) with different polarization states and/or propagation directions without substantial absorption even in various polarization states. For example, the liquid crystal diffraction element 150 is a polymerized liquid crystal film containing an anisotropic periodic molecular structure with a birefringent pattern configured to have a diffraction efficiency greater than about 50%, preferably greater than about 90%.

The polarized light in the first direction 201 emitted from the liquid crystal diffraction element 150 may be orthogonal to the polarized light in the second direction 202. For example, the polarized light in the first direction 201 may be right circularly polarized and the polarized light in the second direction 202 may be left circularly polarized. The liquid crystal diffraction element 150 can diffract the incident light so that the polarization of the light in the first direction 201 and the polarization of the light in the second direction 202 have different propagation directions than the incident light. Therefore, the liquid crystal diffraction element 150 can diffract right circularly polarized light in the first direction 201 and left circularly polarized light in the second direction 202 when the light is incident.

Figure 4:
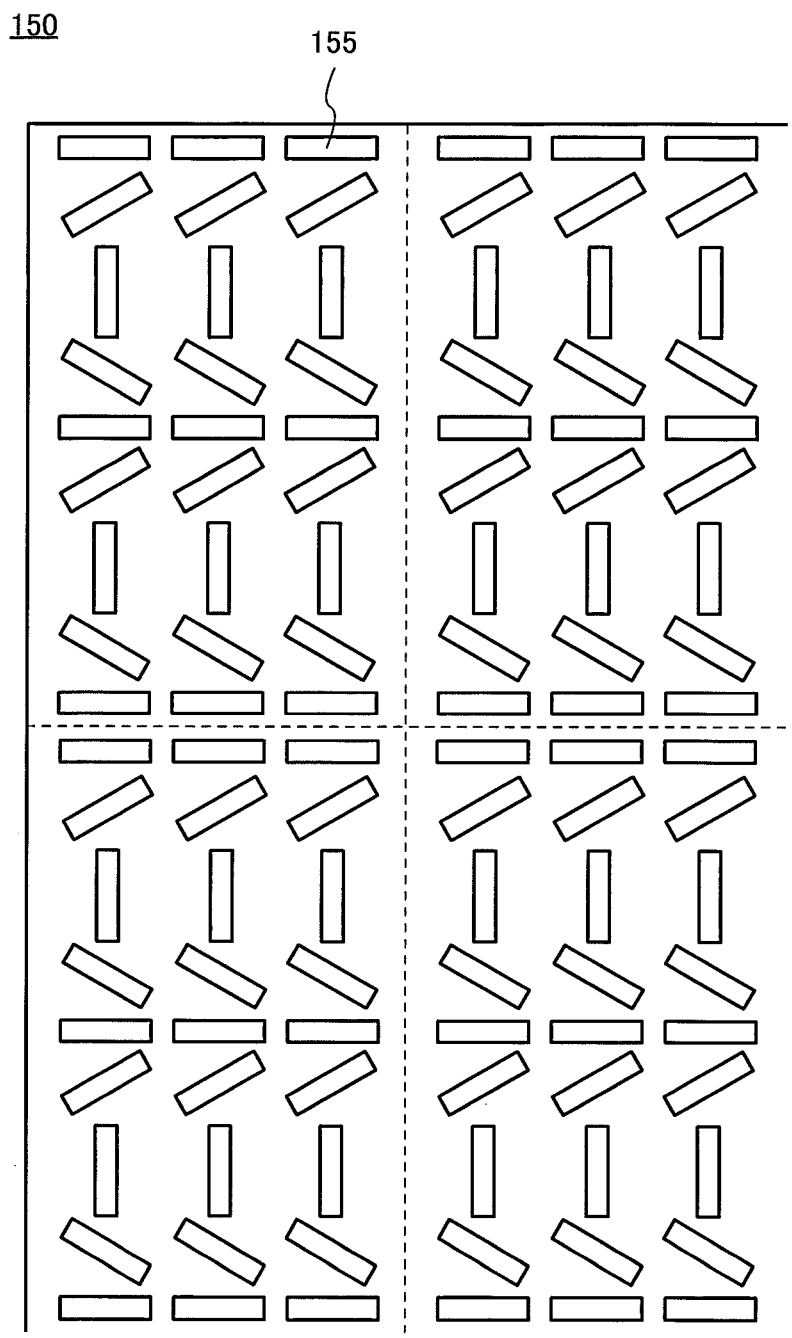
FIG. 4 is a diagram illustrating an example of a liquid crystal diffraction element.

FIG. 4 is a plan view of an example of the liquid crystal diffraction element 150. As shown in FIG. 4, in the liquid crystal diffraction element 150, liquid crystal molecules 155 are periodically arranged. The liquid crystal diffraction element 150 may be in the form of a film.

3. Display Method of Display Device

Next, the display method of the display device 100 is described with reference to FIG. 5A and FIG. 5B. The display device 100 switches the direction in which light is emitted, the first direction 201 or the second direction 202, by turning the variable phase difference element 140 on and off. Light is emitted in both the first direction 201 and the second direction 202 by controlling the voltage applied to the variable phase difference element 140 to an intermediate state between the on state and the off state. When in the intermediate state between the on state and the off state, the direction in which light is emitted can be in the third direction 203. When light is emitted in the third direction 203, for example, the liquid crystal diffraction element 150A described below is structured to be switchable between the on state and off state, and the liquid crystal diffraction element 150A is placed in the off state (diffraction element is not functioning).

Table 1 is the viewing angle direction corresponding to the on state, the off state, or the intermediate state of the variable phase difference element 140 in the display device 100.

TABLE 1

| variable phase difference element | viewing angle direction |
| --- | --- |
| on state | first direction |
| off state | second direction |
| intermediate state | third direction or both first direction and second direction |

Figure 5A:
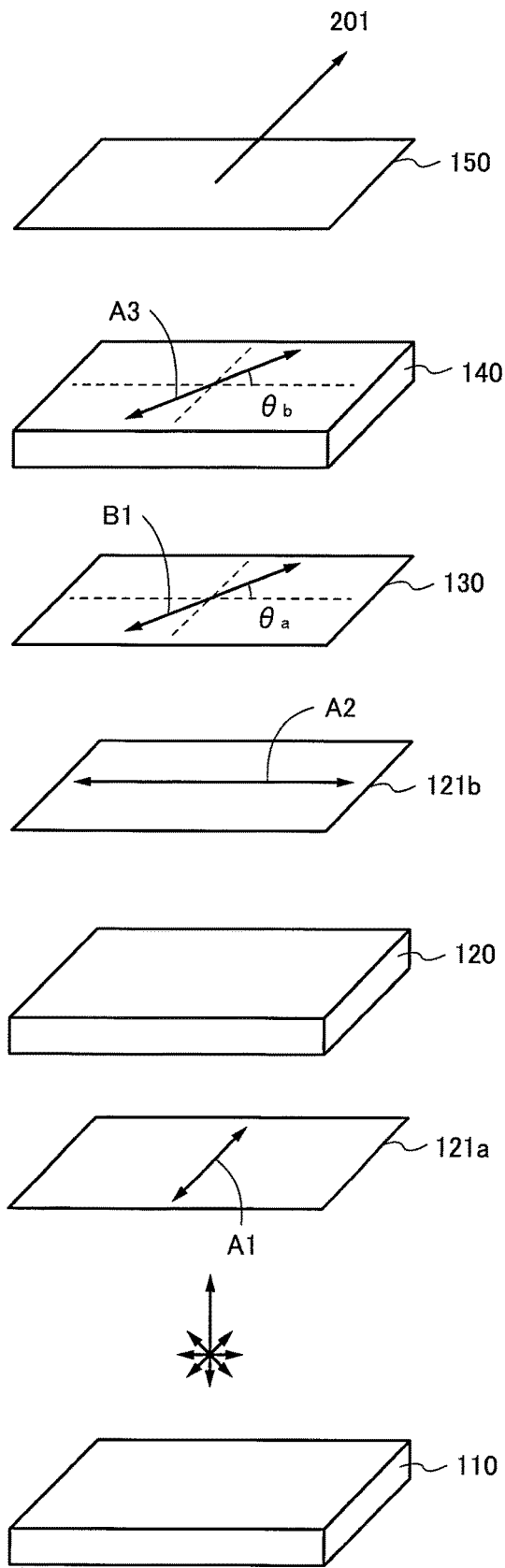
FIG. 5A is an overview of a display device according to an embodiment of the present invention.
Figure 5B:
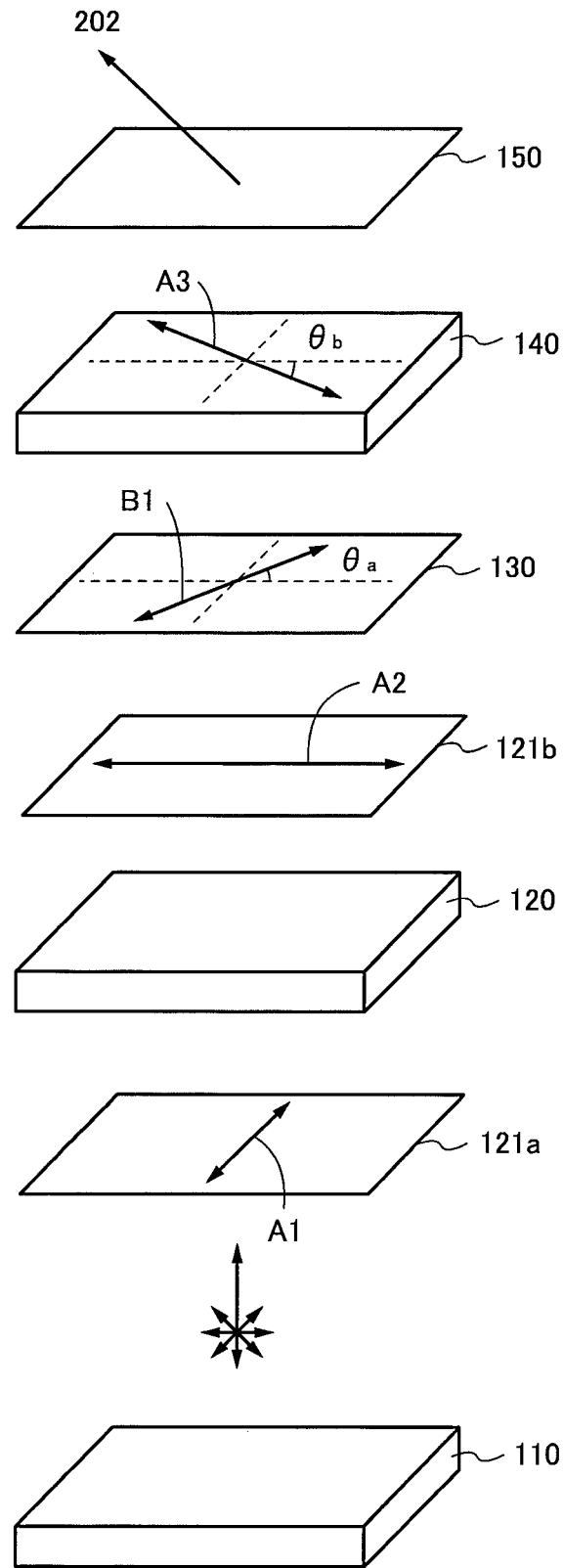
FIG. 5B is an overview of a display device according to an embodiment of the present invention.

FIG. 5A shows polarization when the image 123A is displayed for the viewer I, who is in the right front, with respect to display device 100. FIG. 5B shows the polarization when the image is displayed 123B for the viewer II in the left front, with respect to display device 100.

In the following description, when the variable phase difference element 140 is in the on state, the signal of the first image source corresponding to image 123A is input to the display area 124, and when the variable phase difference element 140 is in the off state, the signal of the second image source corresponding to image 123B is input to the display area 124, and when the variable phase difference element 140 is in the intermediate state, the signal of the third image source corresponding to image 123C is input to the display area 124.

First, the case where the image 123A is displayed to the viewer I in the right front side to the display device 100 will be explained with reference to FIG. 5A. Here, the signal of the first image source corresponding to the image 123A is input to the display area 124. The variable phase difference element 140 is in the on state.

The lighting device 110 emits unpolarized light. In the display device 100, the polarizing plates 121a and 121b transmit a polarization component of an incident light in the direction of a transmission axis. The polarizing plate 121a and the polarizing plate 121b are arranged so that the absorption axis A1 of polarizing plate 121a and the absorption axis A2 of polarizing plate 121b are orthogonal to each other across the image display panel 120. In FIG. 5A and FIG. 5B, rightward and leftward in the left-right direction are defined as azimuth 0° and azimuth 180°, respectively. The absorption axis A1 of the polarizing plate 121A is aligned with the left-right direction. The absorption axis A2 of the polarizing plate 121 is orthogonal to the absorption axis A1. In the following description, the polarizing plates 121a and 121b on the image display panel 120 will be described as being arranged in this orientation.

The unpolarized light emitted from the lighting device 110 is converted to linearly polarized light by passing through the two polarizing plates. In other words, the linearly polarized light is emitted from the display area 124 of the image display panel 120.

The retardation plate 130 has a phase difference of ¼ wavelength. The retardation plate 130 converts the linearly polarized light transmitted through the polarizing plate 121b into right circularly polarized light or left circularly polarized light. In this embodiment, the slow axis B1 of the retardation plate 130 is rotated by $\theta_a=45°$ with respect to the absorption axis A2. Therefore, the retardation plate 130 emits right circularly polarized light when linearly polarized light is incident.

The variable phase difference element 140 is in the on state. In other words, the liquid crystal of the LCD panel is oriented perpendicular to the substrate. In this embodiment, an absorption axis A3 of the variable phase difference element 140 is rotated $\theta_b=45°$ with respect to the absorption axis A2. In other words, the absorption axis A3 is rotated 0° with respect to the slow axis B1. Therefore, even if right circularly polarized light is incident on the variable phase difference element 140, it can be transmitted through the inside of the variable phase difference element 140 and emit right circularly polarized light without substantially changing its phase.

The liquid crystal diffraction element 150 diffracts and polarizes the incident right circularly polarized light and changes the propagation direction of the right circularly polarized light. The liquid crystal diffraction element 150 emits the incident right circularly polarized light in a direction away from the propagation direction (i.e., away from the angle of incidence). In other words, right circularly polarized light can be emitted from the liquid crystal diffraction element 150 in the first direction 201. As a result, the display device 100 can display the image 123A to the viewer I in the first direction 201.

Next, the case of displaying an image to the viewer II in the left front side with respect to the display device 100 will be described with reference to FIG. 5B. Here, the signal of the second image source corresponding to an image 212B is input to the display area 124. The variable phase difference element 140 is in the off state.

As in FIG. 5A, unpolarized light emitted from the lighting device 110 is converted to linearly polarized light by passing through the two polarizing plates 121A and 121B. The retardation plate 130 emits right circularly polarized light when linearly polarized light is incident.

The variable phase difference element 140 is in the off state. In other words, the liquid crystal of the LCD panel is in a twisted state. In this embodiment, the absorption axis A3 of the variable phase difference element 140 is rotated $\theta_b=-45°$ relative to the absorption axis A2. In other words, the absorption axis A3 is rotated 90° with respect to the slow axis B1. Therefore, when right circularly polarized light is input, the variable phase difference element 140 delays the phase by ½ wavelength (i.e., 90°) and emits the light. Therefore, the variable phase difference element 140 converts the incident right circularly polarized light into left circularly polarized light and emits it.

The liquid crystal diffraction element 150 changes the propagation direction of the incident left circularly polarized light. An outgoing light diffracted in a direction away from the propagation direction of the left circularly polarized light incident on the liquid crystal diffraction element 150 (i.e., away from the incident angle) is transmitted. In other words, left circularly polarized light can be emitted from the liquid crystal diffraction element 150 in the second direction 202. As a result, the display device 100 can display the image 123B to the viewer II in the second direction 202.

Next, in the case where an image is displayed to the viewer III in the front with respect to the display device 100 is described. Here, the signal of the third image source corresponding to the image 212C is input to the display area 124. The variable phase difference element 140 is in the intermediate state with a voltage applied between the on state and the off state.

As in FIG. 5A, unpolarized light emitted from the lighting device 110 is converted to a linearly polarized light by passing through the two polarizing plates 121A and 121B. The retardation plate 130 emits right circularly polarized light when the linearly polarized light is incident.

The variable phase difference element 140 is in the intermediate state. In other words, the liquid crystal of the LCD panel is tilted to a state between the on state and the off state. Therefore, the light incident on the variable phase difference element 140 is scattered and emitted. In a structure in which light is emitted in both the first direction 201 and the second direction 202 when the variable phase difference element 140 is in the intermediate state, right circularly polarized light and left circularly polarized light are emitted.

The liquid crystal diffraction element 150 changes the propagation direction of the incident light. The incident light on the liquid crystal diffraction element 150 is emitted to the front. As a result, the display device 100 can display the image 123C to the viewer III in the third direction 203.

As explained above, the display device 100 can switch the direction of the light emitted by controlling the on state, the off state, or the intermediate state of the variable phase difference element 140. For example, when selecting the first image source (navigation image 123A) as the image to be displayed in the display area 124, the viewing angle is controlled so that the image 123A is visible to the viewer I in the driver seat in the first direction 201. In this case, by turning the variable phase difference element 140 to the on state, the image 123A can be shown to the viewer I in the driver seat who is in the first direction 201. For example, if the second image source (entertainment image 123B) is selected as the image to be displayed in the display area 124, the image 123A should not be visible to the viewer I in the driver seat who is in the first direction 201. In this case, the variable phase difference element 140 can be turned to the off state to show the image 123B to the viewer II in the passenger seat in the second direction 202. The image 123B can be not shown to the viewer I in the driver seat who is in the first direction 201. When selecting the third image source (information image 123C) as the image to be displayed in the display area 124, the viewing angle is controlled so that both the viewer I and the viewer II can see the image. To make image 123C visible to both the viewer I and the viewer II, the viewing angle is controlled in the third direction 203. In this way, the display device 100 can display different images to the viewer I in the first direction 201 and the viewer II in the second direction 202 with respect to the display device 100. By controlling the viewing angle in the third direction 203, the image can be displayed to the viewer I and the viewer II.

Next, Modifications 1 to 4 in which the structure of the display device 100 is partially changed will be described.

Modification 1

Figure 6:
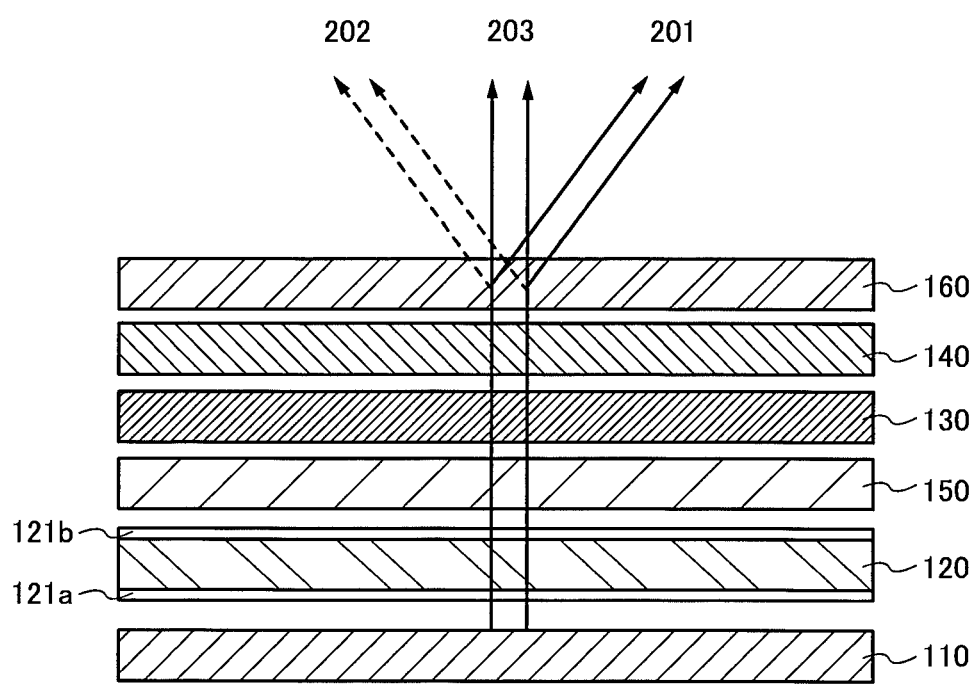
FIG. 6 is a cross-sectional view of a display device according to an embodiment of the present invention.

FIG. 6 shows a cross-sectional view of the display device 100A. The display device 100A has the lighting device 110, the image display panel 120, the liquid crystal diffraction element 150, the retardation plate 130, the variable phase difference element 140, and a polarizing plate 160. In the display device 100, the lighting device 110, the image display panel 120, the liquid crystal diffraction element 150, the retardation plate 130, the variable phase difference element 140, and the polarizing plate 160 are stacked in order from the bottom. In the display device 100A, the relationship in the viewing angle direction corresponding to the on state, the off state, or the intermediate state of the variable phase difference element 140 is the same as in Table 1.

In the display device 100A, the liquid crystal diffraction element 150 is arranged on the image display panel 120. As a result, linearly polarized light emitted from the polarizing plate 121b of the image display panel 120 is polarized and diffracted by the liquid crystal diffraction element 150 and separated into right circularly polarized light emitted in the first direction 201 and left circularly polarized light emitted in the second direction 202.

The retardation plate 130 is arranged on the liquid crystal diffraction element 150. The retardation plate 130 has a phase difference of ¼ wavelength. Therefore, when right circularly polarized light is incident, the retardation plate 130 converts it into linearly polarized light of θ=+45° and emits it. When left circularly polarized light is incident, the retardation plate 130 converts it into linearly polarized light of θ=−45° and emits it.

The variable phase difference element 140 is arranged on the retardation plate 130, and the polarizing plate 160 is arranged on the variable phase difference element 140. The polarizing plate 160 transmits light emitted from the variable phase difference element 140 that matches the transmission axis of the polarizing plate 160 and blocks light that differs from the transmission axis. In this embodiment, the transmission axis of the polarizing plate 160 is θ=+45° relative to the absorption axis of the polarizing plate 121b.

First, the case where the variable phase difference element 140 is in the on state and the first image source is displayed in the display area 124 will be described. When the variable phase difference element 140 is in the on state, the liquid crystal of the liquid crystal panel is oriented perpendicular to the substrate. Therefore, the variable phase difference element 140 can emit linearly polarized light without substantially changing the phase, even when linearly polarized light of θ=+45° and θ=−45° are incident. The light transmitted through the variable phase difference element 140 enters the polarizing plate 160. Here, the transmission axis of the polarizing plate 160 is θ=+45° relative to the absorption axis of the polarizing plate 121b. Therefore, the polarizing plate 160 blocks θ=−45° emitted in the second direction 202 and transmits θ=45° emitted in the first direction 201. This allows the display device 100A to display the image 123A in the first direction 201.

Next, in the case where the variable phase difference element 140 is in the off state and the second image source is displayed in the display area 124 will be described. When the variable phase difference element 140 is in the off state, the liquid crystal of the LCD panel is twisted with respect to the substrate. Therefore, when the variable phase difference element 140 receives incident linearly polarized light of θ=45° and linearly polarized light of θ=−45°, it converts the light to linearly polarized light of θ=−45° and θ=45°. The light transmitted through the variable phase difference element 140 enters the polarizing plate 160. Here, the transmission axis of the polarizing plate 160 is θ=+45° relative to the absorption axis of the polarizing plate 121b. Therefore, the polarizing plate 160 blocks θ=45° emitted in the first direction 201 and transmits θ=−45° emitted in the second direction 202. This allows the display device 100A to display the image 123B in the second direction 202.

The variable phase difference element 140 may be applied with an intermediate voltage between an on-state voltage and an off-state voltage. When an intermediate voltage is applied to the variable phase difference element 140, the orientation of the liquid crystal of the liquid crystal panel is between the on state and the off state. Therefore, the variable phase difference element 140 emits light in both the first direction 201 and the second direction 202 when linearly polarized light of θ=45° or θ=−45° is incident. In a structure in which the liquid crystal diffraction element 150 can be switched ON and OFF, light can be emitted in the third direction 203 when the liquid crystal diffraction element 150 is turned OFF (when the diffraction element is not functioning). The image displayed by the display device 100A in the third direction 203 can be an image from the first image source, an image from the second image source, or an image from the third image source.

According to the display device 100A, when the image of the first image source is displayed in the first direction 201, the brightness of the image in the second direction 202 is reduced. When the image of the second image source is displayed in the second direction 202, the brightness of the image in the first direction 201 is reduced. This allows the display device 100A to improve the contrast of the viewing angle according to the direction in which the image is displayed.

Modification 2

Figure 7A:
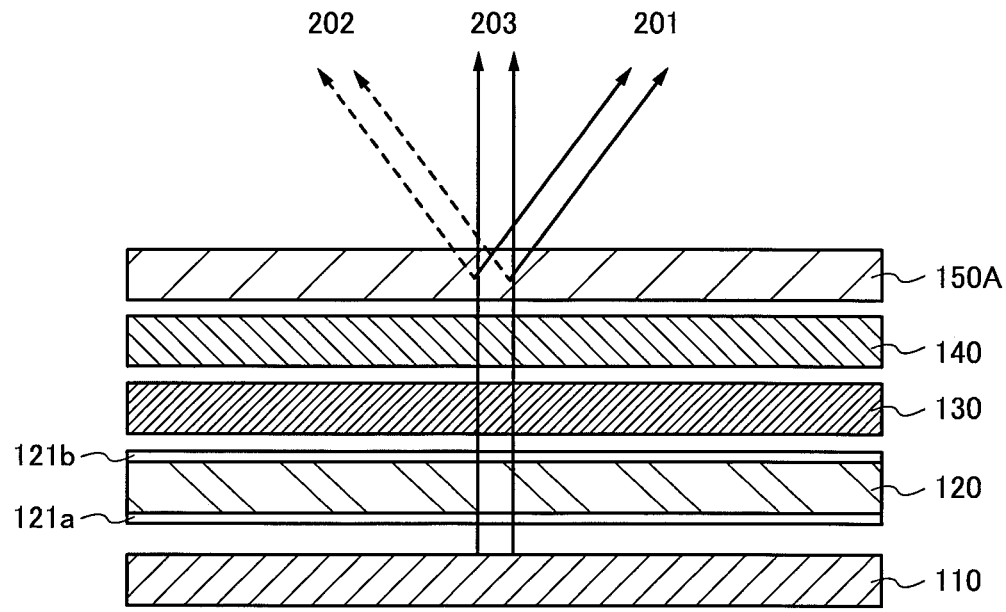
FIG. 7A is a cross-sectional view of a display device according to an embodiment of the present invention.

FIG. 7A is a cross-sectional view of a display device 100B according to an embodiment of the invention. The display device 100B has the lighting device 110, the image display panel 120, the retardation plate 130, the variable phase difference element 140, and a liquid crystal diffraction element 150A. The display device 1001B has the lighting device 110, the image display panel 120, the retardation plate 130, the variable phase difference element 140, and the liquid crystal diffraction element 150A stacked in order from the bottom. The structure of the liquid crystal diffraction element 150A is partially different from that of the liquid crystal diffraction element 150. The liquid crystal diffraction element 150A can control polarization and diffraction by applying a voltage.

Figure 7B:
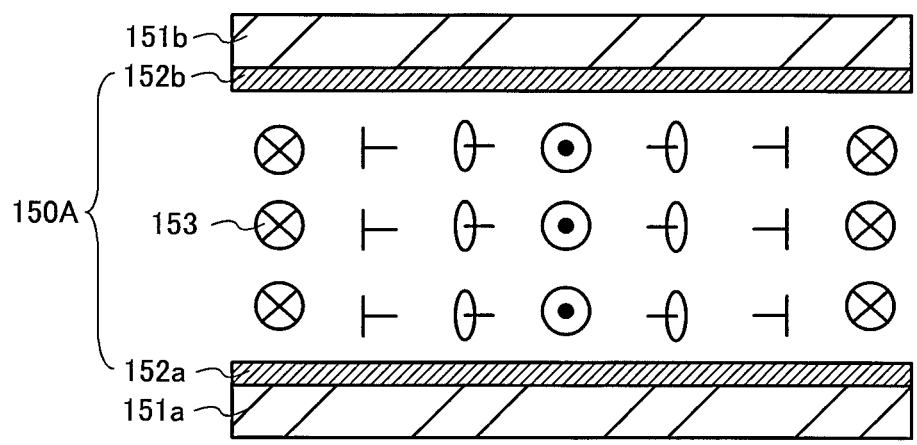
FIG. 7B is an example of the structure of a liquid crystal diffraction element.

FIG. 7B is an example of the liquid crystal diffraction element 150A. The liquid crystal diffraction element 150A has a structure in which a liquid crystal 153 is arranged between an electrode 152a on a substrate 151a and an electrode 152b on a substrate 151b. Here, the electrode 152a is arranged on the entire surface of the substrate 151a. The electrode 152b is arranged on the entire surface of the substrate 151b.

Figure 8A:
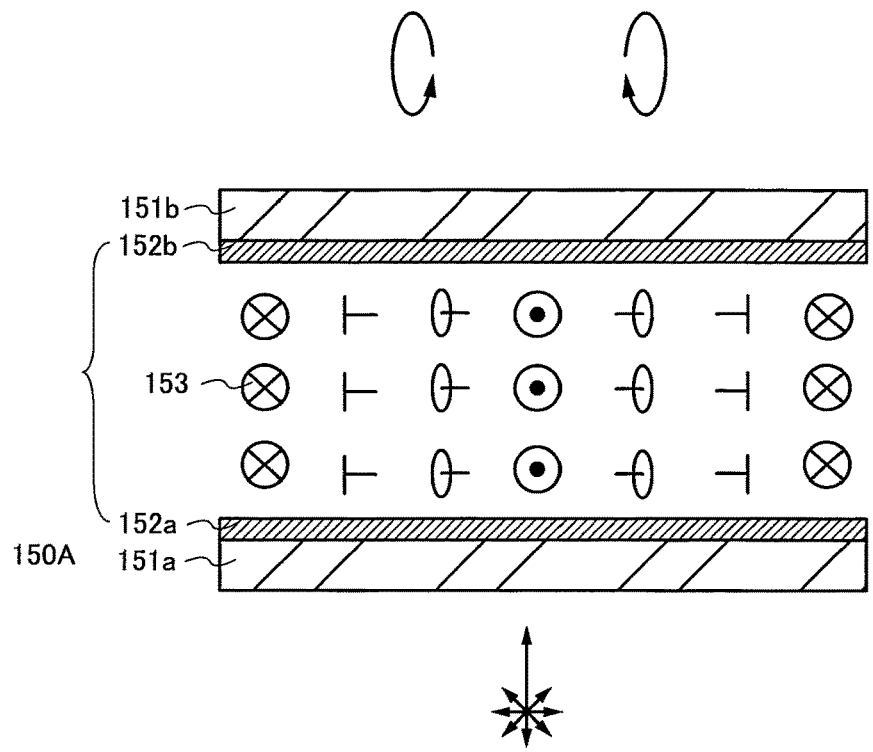
FIG. 8A is an example of the orientation of the liquid crystal of the liquid crystal diffraction element to which no voltage is applied.
Figure 8B:
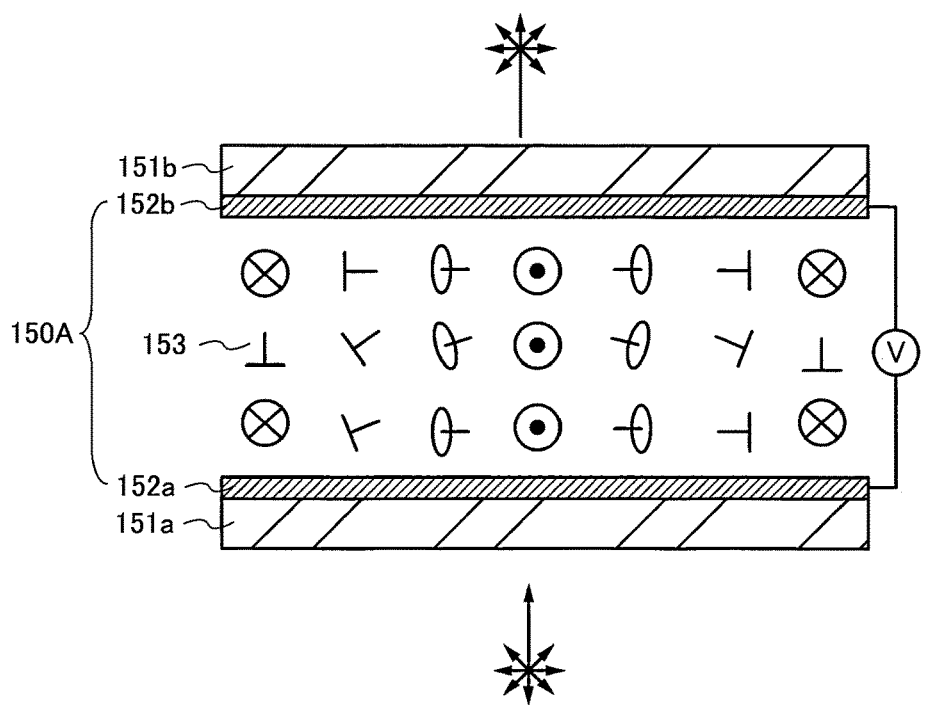
FIG. 8B is an example of the orientation of the liquid crystal of the liquid crystal diffraction element to which voltage is applied.

FIG. 8A shows the orientation state of the liquid crystal molecules before voltage is applied to the liquid crystal diffraction element 150A, and FIG. 8B shows the orientation state of the liquid crystal molecules after voltage is applied to the liquid crystal diffraction element 150B. As shown in FIG. 8A, in the liquid crystal diffraction element 150, the liquid crystal molecules are regularly oriented when no voltage is applied. Therefore, from the time light enters the liquid crystal until it exits, the light becomes right circularly polarized light and left circularly polarized light. As shown in FIG. 8B, when voltage is applied, the liquid crystal molecules are disordered. Therefore, when unpolarized light enters the liquid crystal, it is emitted as the unpolarized light.

In the display device 100B, the on state (with diffraction function) and the off state (without diffraction function) of the liquid crystal diffraction element 150A are combined with the on state and the off state of the variable phase difference element 140. This allows the display device 100B to display images not only in the first direction 201 and the second direction 202, but also in the third direction 203, which is an intermediate between the first direction 201 and the second direction 202.

Table 2 shows the viewing angle directions corresponding to the on state (with diffraction function) and the off state (without diffraction function) of the liquid crystal diffraction element 150 and the on state and the off state of the variable phase difference element 140 in the display device 1001B.

TABLE 2

| variable phase difference element | liquid crystal diffraction element | viewing angle direction |
| --- | --- | --- |
| on state | on state | first direction |
| off state | on state | second direction |
| on state | off state | third direction |
| off state | off state | third direction |

First, the case where the variable phase difference element 140 is in the on state and the liquid crystal diffraction element 150A is in the on state in the display device 100B is described. In this case, unpolarized light emitted from the lighting device 110 is converted to linearly polarized light by passing through the two polarizing plates 121A and 121B. The retardation plate 130 converts the linearly polarized light transmitted through the polarizing plate 121b into right circularly polarized light and emits it.

The variable phase difference element 140 is in the on state. In other words, the liquid crystal of the liquid crystal panel is oriented perpendicularly to the substrate. Therefore, even if right circularly polarized light is incident on the variable phase difference element 140, the phase does not substantially change, and the right circularly polarized light is transmitted through the inside of the variable phase difference element 140 and emitted. The liquid crystal diffraction element 150A is in the on state. The liquid crystal of the liquid crystal diffraction element 150A are in a regular arrangement. Therefore, the liquid crystal diffraction element 150A emits the incident right circularly polarized light in a direction away from the propagation direction (i.e., away from the angle of incidence). In other words, right circularly polarized light can be emitted from the liquid crystal diffraction element 150 in the first direction 201. As a result, the display device 100B can display the image 123A to the viewer I in the first direction 201.

Next, the case where the variable phase difference element 140 is in the off state and the liquid crystal diffraction element 150A is in the on state in the display device 100B will be described. In this case, unpolarized light emitted from the lighting device 110 is converted to linearly polarized light by passing through the two polarizing plates 121A and 121B. The retardation plate 130 converts the linearly polarized light transmitted through the polarizing plate 121b into right circularly polarized light and emits it.

The variable phase difference element 140 is in the off state. In other words, the liquid crystal of the liquid crystal panel of the variable phase difference element 140 is in a twisted state. Therefore, when right circularly polarized light is incident, the variable phase difference element 140 delays the phase by ½ wavelength (i.e., 90°) and emits the light. Therefore, the variable phase difference element 140 converts the incident right circularly polarized light into left circularly polarized light and emits it. The liquid crystal diffraction element 150A is in the on state. The liquid crystals of the liquid crystal diffraction element 150A are in a regular array. Therefore, the liquid crystal diffraction element 150A emits the incident left circularly polarized light in a direction away from the propagation direction (i.e., away from the angle of incidence). In other words, left circularly polarized light can be emitted from the liquid crystal diffraction element 150 in the second direction 202. As a result, the display device 100B can display the image 123B to the viewer II in the second direction 202.

Next, the case where the variable phase difference element 140 is in the off state and the liquid crystal diffraction element 150A is in the off state in the display device 100B will be described. In this case, unpolarized light emitted from the lighting device 110 is converted to linearly polarized light by passing through the two polarizing plates 121A and 121B. The retardation plate 130 converts the linearly polarized light transmitted through the polarizing plate 121b into right circularly polarized light and emits it.

The variable phase difference element 140 is in the off state. In other words, the liquid crystal of the liquid crystal panel of the variable phase difference element 140 is in a twisted state. Therefore, when right circularly polarized light is incident, the variable phase difference element 140 delays the phase by ½ wavelength (i.e., 90°) and emits the light. Therefore, the variable phase difference element 140 converts the incident right circularly polarized light into left circularly polarized light and emits it. The liquid crystal diffraction element 150A is in the off state. The liquid crystal of the liquid crystal diffraction element 150A is disoriented. Therefore, the liquid crystal diffraction element 150A converts the incident left circularly polarized light into unpolarized light and emits it. As a result, the display device 100B can display an image in the third direction 203.

Next, the case where the variable phase difference element 140 is in the on state and the liquid crystal diffraction element 150A is in the off state in the display device 1001B will be described. In this case, the image can be displayed in the third direction 203 in the same way as when the variable phase difference element 140 is in the off state and the liquid crystal diffraction element 150A is in the off state.

According to the display device 100B, the liquid crystal diffraction element 150A can be switched to the on state or the off state. When the liquid crystal diffraction element 150A is in the off state, the orientation of the liquid crystal is disrupted. Therefore, light incident on the liquid crystal diffraction element 150A is scattered. This allows images to be displayed not only in the first direction 201 and the second direction 202, but also in the third direction 203.

Modification 3

Figure 9:
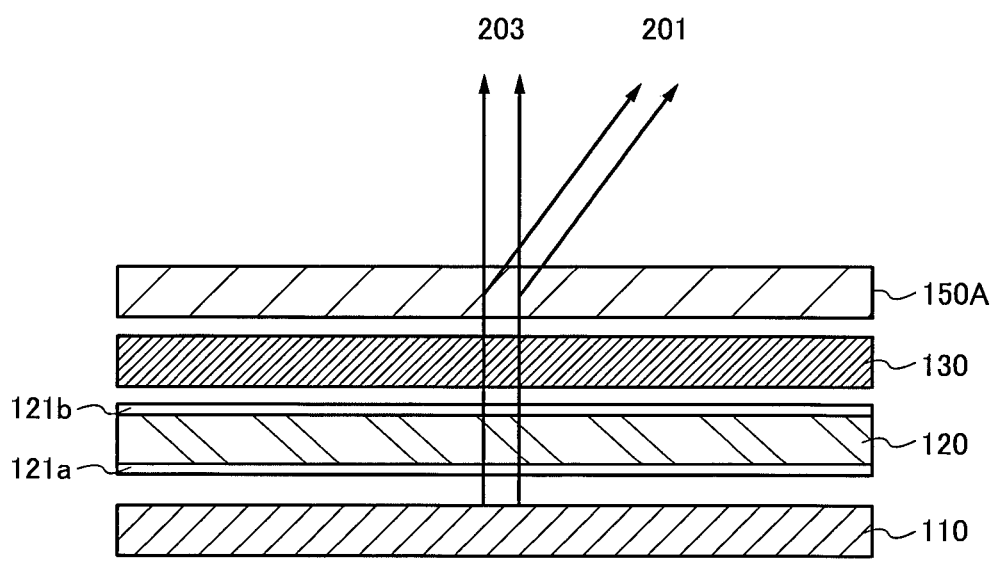
FIG. 9 is a cross-sectional view of a display device according to an embodiment of the present invention.

FIG. 9 is a cross-sectional view of a display device 100C according to an embodiment of the invention. The display device 100C has the lighting device 110, the image display panel 120, the retardation plate 130, and the liquid crystal diffraction element 150A, stacked in order from the bottom.

The structure of the display device 100C is such that the variable phase difference element 140 in the display device 100B is omitted. Therefore, in the display device 100C, the viewing angle of the image displayed in the display area 124 can be controlled depending on whether the liquid crystal diffraction element 150A is in the on state or the off state.

Table 3 shows the viewing angle directions corresponding to the on state and the off state of the liquid crystal diffraction element 150A in the display device 100G.

TABLE 3

| liquid crystal diffraction element | viewing angle direction |
|---|---|
| on state | first direction |
| off state | third direction |

First, the case where the liquid crystal diffraction element 150A is in the on state is described. Unpolarized light emitted from the lighting device 110 is converted to linearly polarized light by passing through the two polarizing plates 121A and 121B. The retardation plate 130 emits right circularly polarized light when linearly polarized light is incident. The liquid crystal diffraction element 150A is in the on state. The liquid crystals of the liquid crystal diffraction element 150A are in a regular array. Therefore, the liquid crystal diffraction element 150A emits the incident right circularly polarized light in a direction away from the propagation direction (i.e., away from the angle of incidence). In other words, right circularly polarized light can be emitted from the liquid crystal diffraction element 150 in the first direction 201. As a result, the display device 1001B can display the image 123A to the viewer I in the first direction 201.

Next, in the case where the liquid crystal diffraction element 150A is in the off state will be described. Unpolarized light emitted from the lighting device 110 is converted to linearly polarized light by passing through the two polarizing plates 121A and 121B. The retardation plate 130 emits right circularly polarized light when linearly polarized light is incident. When the liquid crystal diffraction element 150A is in the off state, the liquid crystal of the liquid crystal diffraction element 150A is disoriented. Therefore, the liquid crystal diffraction element 150A converts the incident right circularly polarized light into unpolarized light and emits it. As a result, the display device 1001B can display an image in the third direction 203.

According to the display device 100C, the variable phase difference element 140 is omitted compared to the display device 100B. Therefore, the image displayed in the display area 124 can be displayed in the first direction 201 or the third direction 203.

Modification 4

In the display device 100, the on state or the off state of the variable phase difference element 140 and the operation of the image display panel 120 may be synchronized. For example, the first image source and the second image source to be displayed in the display area 124 may be displayed alternately in a time-divisional manner.

The on state and the off state of the variable phase difference element 140 may be switched to match the timing of switching between the first image source and the second image source. For example, when displaying an image of the first image source on the image display panel 120, the variable phase difference element 140 is turned on. This allows the image 123A to be displayed in the first direction 201 from the liquid crystal diffraction element 150. When the image of the second image source is to be displayed on the image display panel 120, the variable phase difference element 140 is turned off. This allows the image 123B to be displayed in the second direction 202 from the liquid crystal diffraction element 150.

This allows the display device 100 to alternately display the image 123A of the first image source in the first direction 201 and the image 123B of the second image source in the second direction 202 in the display area 124.

Second Embodiment

Display devices 100D to 100F according to an embodiment of the present invention are described with reference to FIG. 10 to FIG. 12.

Figure 10:
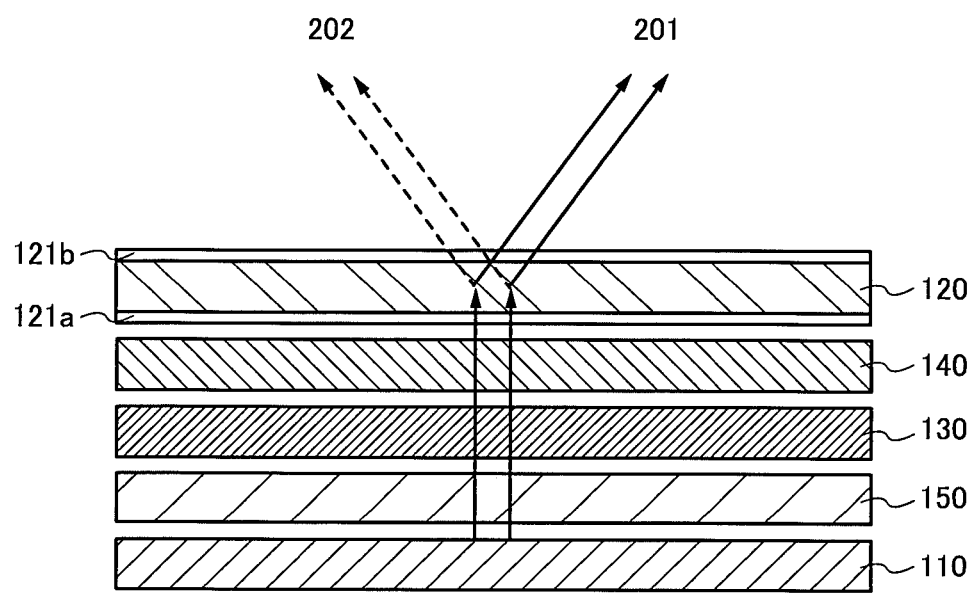
FIG. 10 is a cross-sectional view of a display device according to an embodiment of the present invention.

FIG. 10 is a cross-sectional view of the display device 100D according to an embodiment of the invention. The display device 100D has the lighting device 110, the liquid crystal diffraction element 150, the retardation plate 130, the variable phase difference element 140, and the image display panel 120. In the display device 100D, the lighting device 110, the liquid crystal diffraction element 150, the retardation plate 130, the variable phase difference element 140, and the image display panel 120 are stacked in order from the bottom. In the display device 100D, the relationship in the viewing angle direction corresponding to the on state, the off state, or the intermediate state of the variable phase difference element 140 is the same as in Table 1.

First, the case where the variable phase difference element 140 is in the off state will be described. The liquid crystal diffraction element 150 converts unpolarized light emitted from the lighting device 110 into right circularly polarized light in the first direction 201 and left circularly polarized light in the second direction 202 when the light is incident. The retardation plate 130 converts right circularly polarized light and left circularly polarized light into linearly polarized light of $\theta=+45°$ and $\theta=-45°$, respectively, when they are incident. The variable phase difference element 140 is in the off state. Therefore, when linearly polarized light of $\theta=+45°$ is incident, the variable retardation plate 140 delays the phase by ½ wavelength and emits the light. When linearly polarized light of $\theta=-45°$ is incident, it is emitted with a half-wavelength phase delay. Of the linearly polarized light of $\theta=+45°$ in the second direction 202 and of $\theta=-45°$ in the first direction 201 emitted from the variable phase difference element 140, the linearly polarized light matching the transmission axis of the polarizing plate 121a is transmitted. Here, since the transmission axis of the polarizing plate 121a is $\theta=+45°$, the linear polarization of $\theta=+45°$ in the second direction 202 is transmitted. Therefore, the display device 100D emits the image 123B of the second image source in the second direction 202.

Next, in the case where the variable phase difference element 140 is in the on state will be described. The liquid crystal diffraction element 150 converts unpolarized light emitted from the lighting device 110 into right circularly polarized light in the first direction 201 and left circularly polarized light in the second direction 202 when the light is incident. The retardation plate 130 converts right circularly polarized light and left circularly polarized light into linearly polarized light of $\theta=+45°$ and $\theta=-45°$, respectively, when the light is incident. The variable phase difference element 140 is in the on state. Therefore, the variable retardation plate 140 transmits the linearly polarized light of θ=+45° and the linearly polarized light of θ=−45° through the inside of the variable retardation plate 140 without substantially changing the phase when the linearly polarized light of θ=+45° and θ=−45° is incident, and emits linearly polarized light of θ=+45° and θ=−45°. Of the linearly polarized light of θ=+45° in the first direction 201 and the linearly polarized light of θ=−45° in the second direction 202 emitted from the variable phase difference element 140, the linearly polarized light matching the transmission axis of the polarizing plate 121a is transmitted. Here, since the transmission axis of the polarizing plate 121a is θ=+45°, linearly polarized light of θ=+45° in the first direction 201 is transmitted. Therefore, the display device 100D emits the image 123A of the first image source in the first direction 201.

Next, in the case where the variable phase difference element 140 is in the intermediate state between the on state and the off state will be described. By controlling the voltage applied to the variable phase difference element 140 so that it is in the intermediate state between the on state and the off state, light is emitted in both the first direction 201 and the second direction 202. When the variable phase difference element 140 is in the intermediate state between the on state and the off state, the direction in which light is emitted can be in the third direction 203. When light is emitted in the third direction 203, the liquid crystal diffraction element 150 is structured to be switchable between the on state and the off state, and the liquid crystal diffraction element 150 is placed in the off state (diffraction element is not functioning).

According to the display device 100D, when displaying an image of the first image source in the first direction 201, the brightness of the image is reduced in the second direction 202. When the image of the second image source is displayed in the second direction 202, the brightness of the image is reduced in the first direction 201. This allows the display device 100D to improve the contrast of the viewing angle in which the image is displayed.

Modification 5

Figure 11:
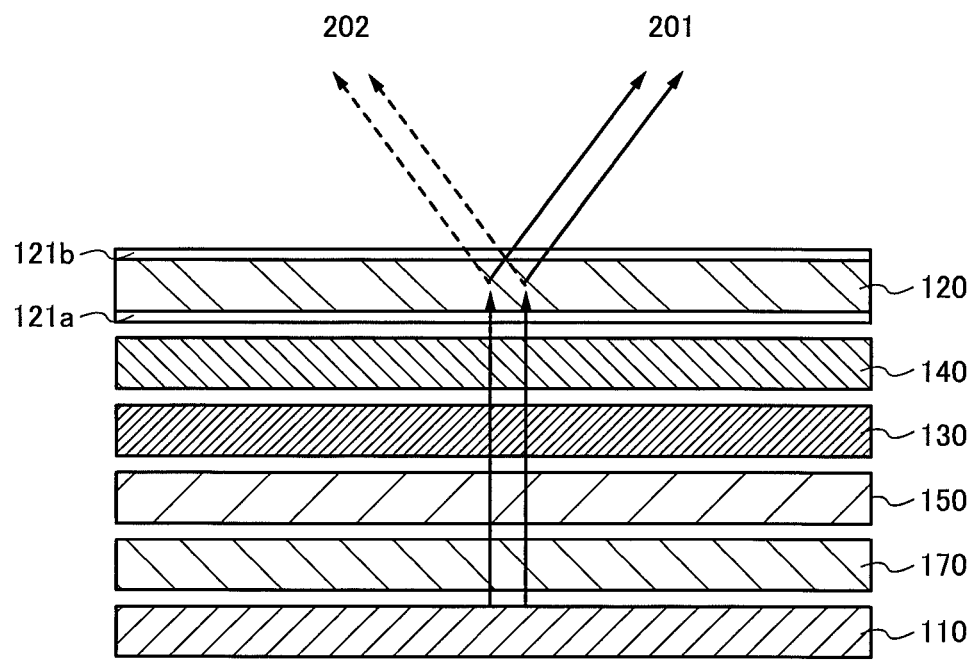
FIG. 11 is a cross-sectional view of a display device according to an embodiment of the present invention.

FIG. 11 is a cross-sectional view of the display device 100E according to an embodiment of the invention. The display device 100E further has a reflective polarizing film 170 between the lighting device 110 and the liquid crystal diffraction element 150 included in the display device 100D.

When unpolarized light is incident from the lighting device 110, the reflective polarizing film 170 converts the light to linearly polarized light. Thereafter, the method of displaying an image in the first direction 201 and in the second direction 202 is the same as that described in the display device 100D. In the display device 100E, the relationship between the viewing angle directions corresponding to the on state, the off state, or the intermediate state of the variable phase difference element 140 is the same as in Table 1.

The reflective polarizing film 170 can improve the emission of the light emitted from the lighting device 110 without causing the polarizing plate 121A to absorb the light and without interfering with the viewing angle. Therefore, by providing the reflective polarizing film 170 between the lighting device 110 and the liquid crystal diffraction element 150, the light utilization efficiency is improved. Therefore, the display device 100E can reduce power consumption compared to the display device 100D without the reflective polarizing film 170.

Modification 6

Figure 12:
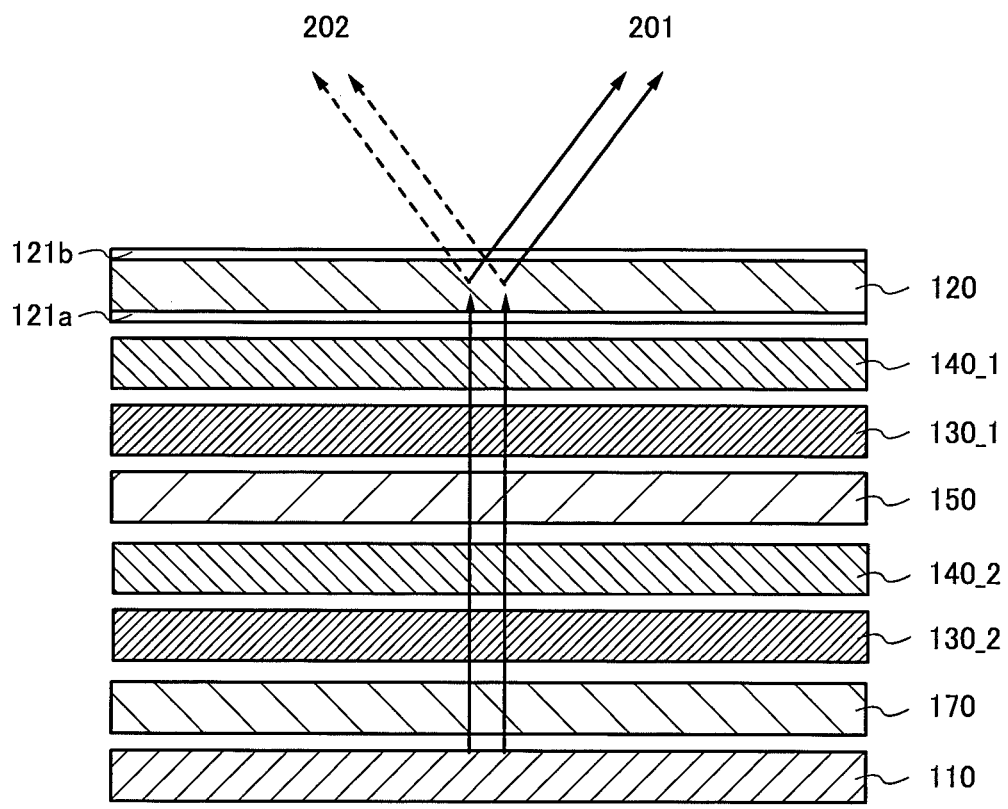
FIG. 12 is a cross-sectional view of a display device according to an embodiment of the present invention.

FIG. 12 shows a cross-sectional view of a display device 100F according to an embodiment of the invention. The display device 100F further has a retardation plate 130_2 and a variable retardation element 140_2 between the reflective polarizing film 170 and the liquid crystal diffraction element 150 included in the display device 100E. In FIG. 12, the structure of the retardation plates 130_1 and 130_2 is the same as that of the retardation plate 130, and the structure of the variable phase difference elements 140_1 and 140_2 is the same as that of the variable phase difference element 140.

In the display device 100F, the direction of the emitted light is controlled by the on state or the off state of the variable phase difference elements 140_1 and 140_2. There are cases where the variable phase difference element 140_1 is in the on state and the variable phase difference element 140_2 is in the on state, cases where the variable phase difference element 140_2 is in the off state and the variable phase difference element 140_2 is in the off state, and cases where the variable phase difference element 140_1 is in the intermediate state and the variable phase difference element 140_2 is in the intermediate state.

Table 4 shows the relationship in the viewing angle direction corresponding to the on state, the off state, or the intermediate state of the variable phase difference elements 140_1 and 140_2 in the display device 100F.

TABLE 4

| variable phase difference element 140_1 | variable phase difference element 140_2 | viewing angle direction |
| --- | --- | --- |
| on state | on state | first direction |
| off state | off state | second direction |
| intermediate state | intermediate state | third direction |

First, in the case where the variable phase difference elements 140_1 and 140_2 are in the on state in the display device 100F will be described. The reflective polarizing film 170 converts unpolarized light from the lighting device 110 to linearly polarized light when it is incident. The slow axis B1 of the retardation plate 130_2 is rotated by θ=+45° relative to the absorption axis of the reflective polarizing film 170. Therefore, the retardation plate 130_2 emits right circularly polarized light when linearly polarized light is incident.

The variable phase difference element 140_2 is in the on state. Therefore, when right circularly polarized light is incident on the variable phase difference element 1402, the right circularly polarized light is transmitted through the inside of the variable phase difference element 140 and is emitted without any substantial phase change. The liquid crystal diffraction element 150 diffracts and polarizes the incident right circularly polarized light, thereby emitting right circularly polarized light in the first direction 201.

The slow axis B1 of the retardation plate 130_1 is rotated by θ=+45° relative to the absorption axis of the reflective polarizing film 170. Therefore, the retardation plate 130_1 converts right circularly polarized light into linearly polarized light of θ=+45° when it is incident. The variable phase difference element 140_1 is in the on state. Therefore, when linearly polarized light of θ=+45° is incident on the variable retardation element 140_1, it is transmitted through the inside of the variable phase difference element 140 without substantially changing the phase difference, and linearly polarized light of θ=+45° is emitted. Here, the transmission axis of the polarizing plate 121A is θ=+45°, so linearly polarized light of θ=+45° in the first direction 201 is transmitted. Therefore, the display device 100D emits the image 123A of the first image source in the first direction 201.

Next, the case where the variable phase difference elements 140_1 and 140_2 are in the off state in the display device 100F will be described. The reflective polarizing film 170 converts unpolarized light from the lighting device 110 to linearly polarized light when the unpolarized light is incident. The slow axis B1 of the retardation plate 130_2 is rotated by θ=+45° relative to the absorption axis of the reflective polarizing film 170. Therefore, the retardation plate 130_2 emits right circularly polarized light when linearly polarized light is incident.

The variable phase difference element 140_2 is in the off state. Therefore, when right circularly polarized light is incident on the variable phase difference element 1402, it is converted to left circularly polarized light and emitted. The liquid crystal diffraction element 150 diffracts and polarizes the incident left circularly polarized light and emits left circularly polarized light in the second direction 202.

The slow axis B1 of the retardation plate 130_2 is rotated by θ=+45° relative to the absorption axis of the reflective polarizing film 170. Therefore, the retardation plate 130_2 converts left circularly polarized light into linearly polarized light with θ=−45° when the light is incident. The variable phase difference element 140_1 is in the off state. Therefore, when linearly polarized light of θ=−45° is incident on the variable phase difference element 140_1, linearly polarized light of θ=+45° is emitted. Here, the transmission axis of the polarizing plate 121a is θ=+45°, so the linearly polarized light of θ=+45° in the second direction 202 is transmitted. Therefore, the display device 100D emits the image 123B of the second image source in the second direction 202.

Next, the case where the variable phase difference elements 140_1 and 140_2 are in the intermediate state between the on state and the off state will be described. By controlling the voltage applied to the variable phase difference elements 140_1 and 140_2 so that they are in the intermediate state between the on state and the off state, light is emitted in both the first direction 201 and the second direction 202. When the variable phase difference elements 140_1 and 140_2 are in the intermediate state between the on state and the off state, the direction in which light is emitted can be in the third direction 203. When light is emitted in the third direction 203, for example, the liquid crystal diffraction element 150 is structured so that it can be switched between the on state and the off state, and the liquid crystal diffraction element 150 is placed in the off state (diffraction element does not function).

According to the display device 100F, the luminance can be increased by the reflective polarizing film 170. In the case of display devices 100D and 100E, one of the light separated into right circularly polarized light and left circularly polarized light by the liquid crystal diffraction element 150 must be blocked by the polarizing plate 121A. In the display device 100F, there is no need to separate the light into right circularly polarized light and left circularly polarized light by the liquid crystal diffraction element 150, so the polarization efficiency can be improved.

Third Embodiment

Display devices 100G and 100H according to an embodiment of the present invention will be described with reference to FIG. 13 and FIG. 14. In this embodiment, an example of using a self-illuminated display panel as an image display panel 120F will be described. Therefore, the lighting device 110 is omitted from the display devices 100G and 100H compared to the display device 100. In the display devices 100G and 100H, the relationship in the viewing angle direction corresponding to the on state, the off state, or the intermediate state of the variable phase difference element 140 is the same as in Table 1.

Figure 13:
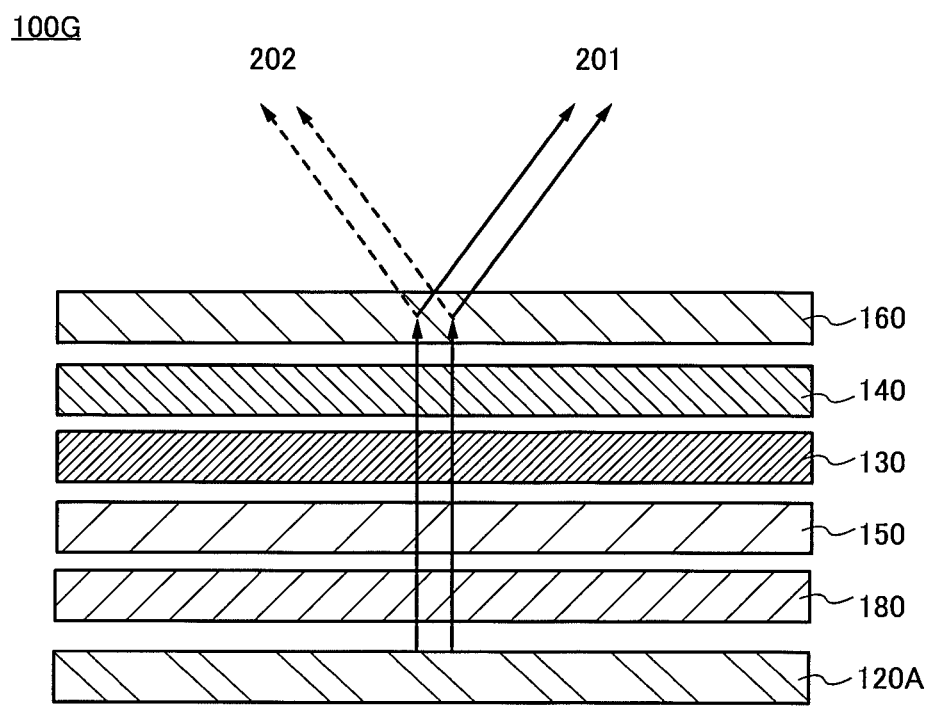
FIG. 13 is a cross-sectional view of a display device according to an embodiment of the present invention.

FIG. 13 shows a cross-sectional view of the display device 100G. The display device 100G has the image display panel 120A, a louver film 180, the liquid crystal diffraction element 150, the retardation plate 130, the variable phase difference element 140, and the polarizing plate 160. In the display device 100G, the image display panel 120A, the louver film 180, the liquid crystal diffraction element 150, the retardation plate 130, the variable phase difference element 140, and the polarizing plate 160 are stacked in order from the bottom.

In this embodiment, an OLED display panel, a mini LED display panel, or a micro LED display panel is used as the image display panel 120A. Since these display panels are self-illuminated display panels, the lighting device 110 can be omitted. In the image display panel 120A, the polarizing plates 121A and 121B are omitted.

The louver film 180 is arranged on the image display panel 120A. The louver film can be applied on the self-illuminated image display panel 120A to control the travel direction of light emitted from the image display panel 120A to a predetermined emission angle. As a result, the direction of travel of light emitted from the image display panel 120A can be controlled. In addition, linearly polarized light is emitted from the louver film 180.

The liquid crystal diffraction element 150 is arranged on the louver film 180. The liquid crystal diffraction element 150 separates and emits linearly polarized light into right circularly polarized light in the first direction 201 and left circularly polarized light in the second direction 202.

The retardation plate 130 is arranged on the liquid crystal diffraction element 150. The retardation plate 130 converts the right circularly polarized light in the first direction 201 and the left circularly polarized light in the second direction 202 into linearly polarized light of θ=+45° in the first direction 201 and into linearly polarized light of θ=−45° in the second direction 202.

The variable phase difference element 140 is arranged on the retardation plate 130. When the variable retardation plate 140 is in the on state, the variable retardation plate 140 transmits the linearly polarized light of θ=+45° and the linearly polarized light of θ=−45° through the interior of the variable retardation plate 140 without substantially changing phase when the linearly polarized light of θ=+45° and θ=−45° linear polarization is emitted. Of θ=+45° linearly polarized light and θ=−45° linearly polarized light emitted from the variable phase difference element 140, the linearly polarized light that matches the transmission axis of the polarizing plate 160 is transmitted. Here, since the transmission axis of the polarizing plate 160 is θ=+45°, the linearly polarized light of θ=+45° in the first direction 201 is transmitted. Therefore, the display device 100G can emit the image 123A of the first image source in the first direction 201.

When the variable retardation plate 140 is in the off state, the variable retardation plate 140 delays the phase by ½ wavelength when linearly polarized light of θ=+45° is incident and emitted. When linearly polarized light of θ=−45° is incident, it is emitted with a half-wavelength phase delay. Of θ=+45° linearly polarized light in the second direction 202 and θ=−45° linearly polarized light in the first direction 201 emitted from the variable phase difference element 140, the linearly polarized light that matches the transmission axis of the polarizing plate 160 is transmitted. Here, since the transmission axis of the polarizing plate 160 is θ=+45°, the linear polarization of θ=+45° in the second direction 202 is transmitted. Therefore, the display device 100G can emit the image 123B of the second image source in the second direction 202.

Modification 7

Figure 14:
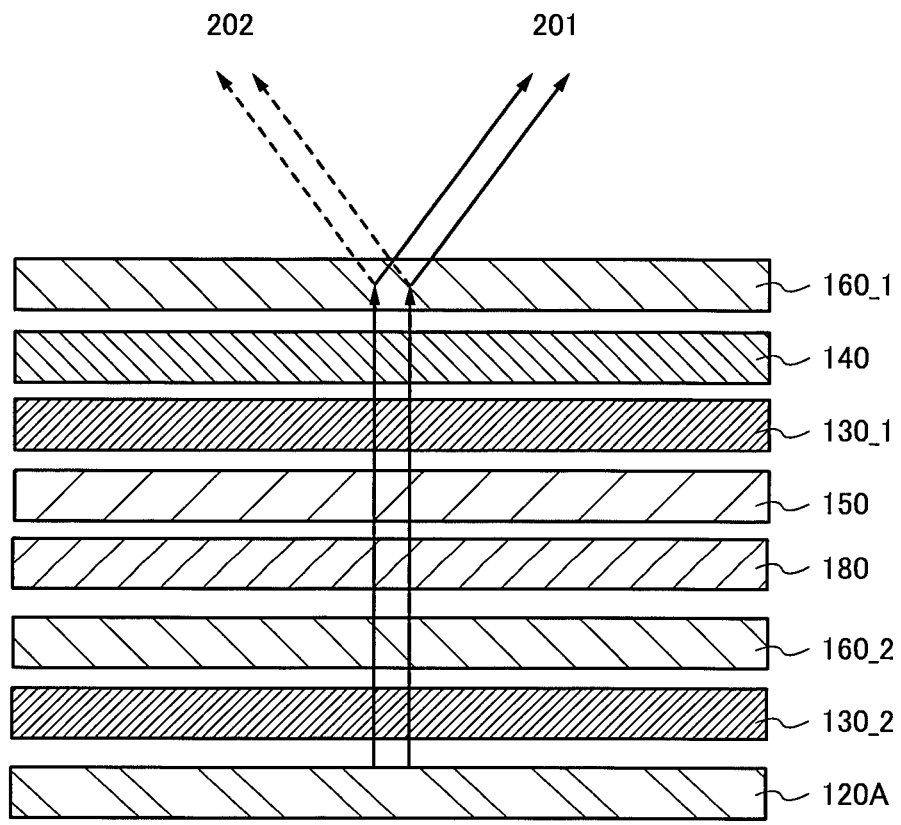
FIG. 14 is a cross-sectional view of a display device according to an embodiment of the present invention.

FIG. 14 shows a cross-sectional view of the display device 100H according to an embodiment of the invention. The display device 100H further has a retardation plate 130_2 and a polarizing plate 160_2 between the image display panel 120 and the louver film 180 included in the display device 100G. In FIG. 14, the structure of the retardation plates 130_1 and 130_2 is the same as that of the retardation plate 130, and the structure of the polarizing plates 160_1 and 160_2 is the same as that of the polarizing plate 160.

The retardation plate 130_2 and the polarizing plate 160_2 are arranged on the image display panel 120A. By providing the retardation plate 130_2 and the polarizing plate 160_2, reflection can be prevented. In addition, the louver film 180 is arranged on the polarizing plate 160_2 to control the direction of travel of light emitted from the polarizing plate 160_2 to a predetermined emission angle. As a result, the direction of travel of the light emitted from the polarizing plate 160_2 can be controlled.

In the display device 100H, the structure of the liquid crystal diffraction element 150, the retardation plate 130_1, the variable phase difference element 140, and the polarizing plate 160_1 is the same as that of the display device 100G.

The display device 100H further has the retardation plate 130_2 and the polarizing plate 160_2 between the image display panel 120 and the louver film 180. As a result, the influence of external light can be reduced when external light is strong.

Although the example of providing the louver film 180 on the image display panel 120 in the display devices 100G and 100H has been described, the present invention is not limited to this example. For example, the louver film 180 may not be arranged for the image display panel 120 to which a reflective plate or the like is attached to collimate light.

Fourth Embodiment

In this embodiment, display devices 100I-100L using a liquid crystal element 190 (also called liquid crystal lenses) instead of the liquid crystal diffraction elements 150 will be described with reference to FIG. 15A to FIG. 20B.

Figure 15A:
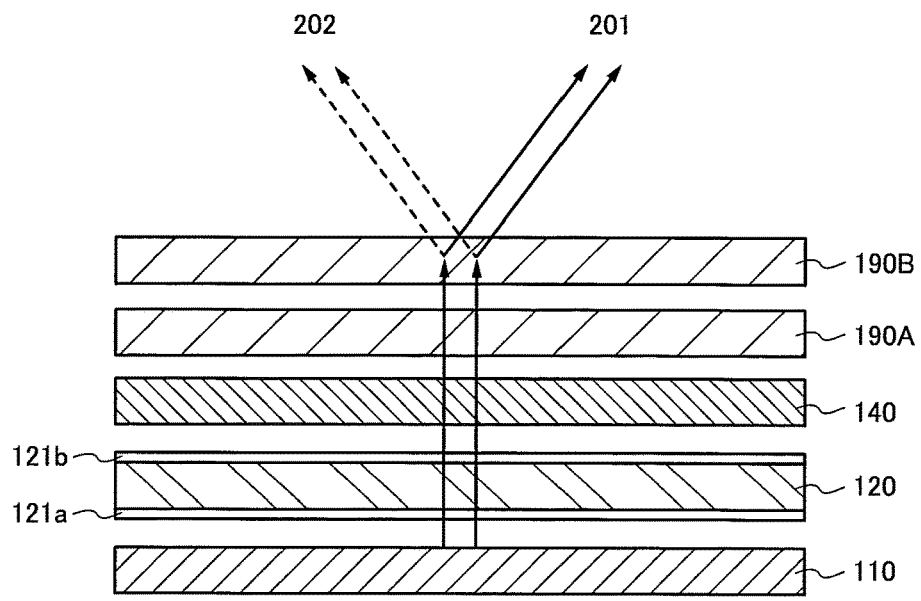
FIG. 15A is a cross-sectional view of a display device according to an embodiment of the present invention.
Figure 15B:
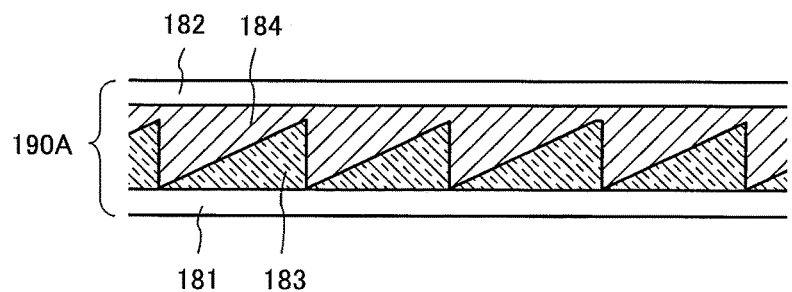
FIG. 15B is an example of the structure of a liquid crystal element.
Figure 15C:
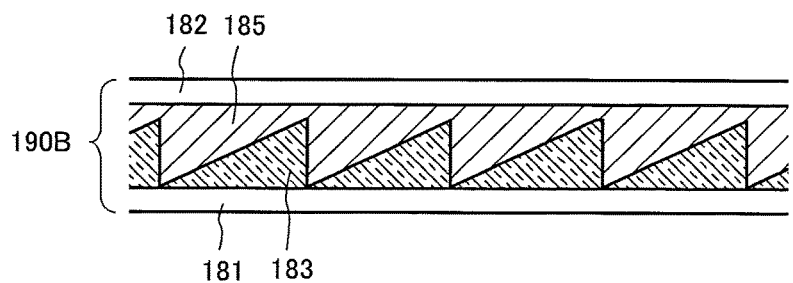
FIG. 15C is an example of the structure of a liquid crystal element.

FIG. 15A is the display device 100I according to an embodiment of the invention, and FIG. 15B is an example of a structure of the liquid crystal element 190. The display device 100I has the lighting device 110, the image display panel 120, the variable phase difference element 140, a liquid crystal element 190A, and a liquid crystal element 190B.

The liquid crystal element 190A has substrates 181, 182, a liquid crystal 183, and a resin layer 184. The liquid crystal element 190B has the substrates 181, 182, the liquid crystal 183, and a resin layer 185. Here, the liquid crystal 183 is oriented horizontally with respect to the substrates 181 and 182. The difference between the liquid crystal element 190A and the liquid crystal element 190B is the refractive index of the resin layers 184 and 185. For example, by setting the refractive index of the resin layer 184 as 1.7 and the refractive index of the resin layer 185 as 1.5, light can be refracted by the amount of phase difference.

For example, the liquid crystal element 190A should be bent in the first direction 201 and the liquid crystal element 190B in the second direction 202. The orientation directions of the liquid crystal elements 190A and 190B should be different by 90°. This allows the liquid crystal element 190A to be acted on when a certain polarized light is incident, and the liquid crystal element 190B to be acted on when a light with a direction rotated 90° from a certain polarized light is incident.

Table 5 shows the viewing angle directions corresponding to the on state or the off state of the variable phase difference element 140 in the display device 100I.

TABLE 5

| variable phase difference element | viewing angle direction |
|---|---|
| on state | first direction |
| off state | second direction |

In the display device 100I, the direction of polarization can be changed by switching the variable phase difference element 140 to the on state or the off state. Therefore, by switching the variable phase difference element 140 to the on state or the off state, the direction of emission in the first or second direction can be changed. In the on state, light is emitted in the first direction (right side), and in the off state, light is emitted in the second direction (left side).

In the display device 100I, the liquid crystal elements 190A and 190B are inactive. In the liquid crystal elements 190A and 190B, there should be a refractive index difference between the liquid crystal and the resin layer. In the display device 100I, the liquid crystal 183 is oriented horizontally with respect to the substrates 181 and 182, but is not limited. The liquid crystal 183 may be oriented vertically with respect to the substrates 181 and 182. The resin layers 184 and 185 may also be made of materials having different refractive indexes. The lighting device 110 should be collimated to some extent.

Modification 8

Next, the display device 100J, which differs in some structures from the display device 100I, is described with reference to FIG. 16A and FIG. 16B.

Figure 16A:
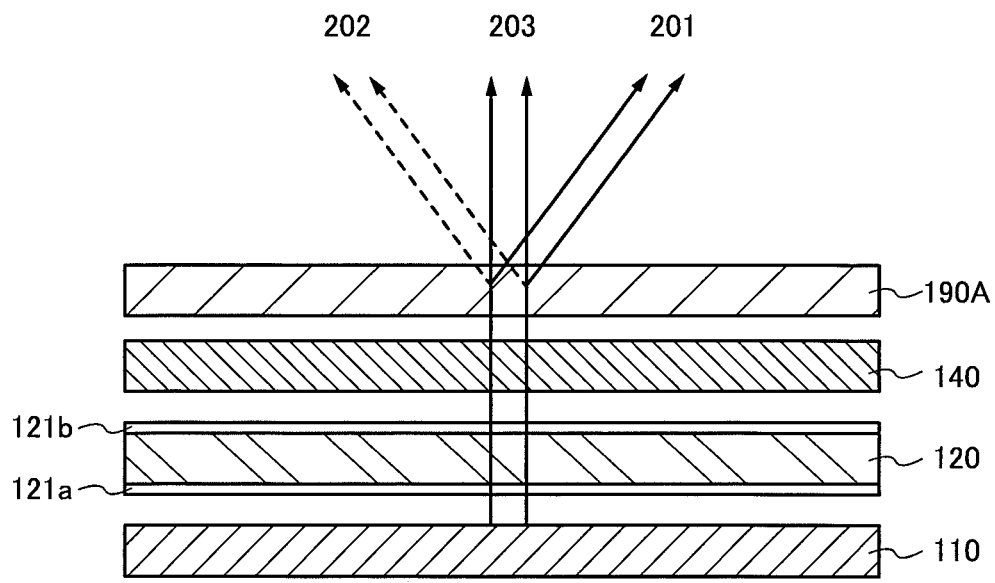
FIG. 16A is a cross-sectional view of a display device according to an embodiment of the present invention.
Figure 16B:
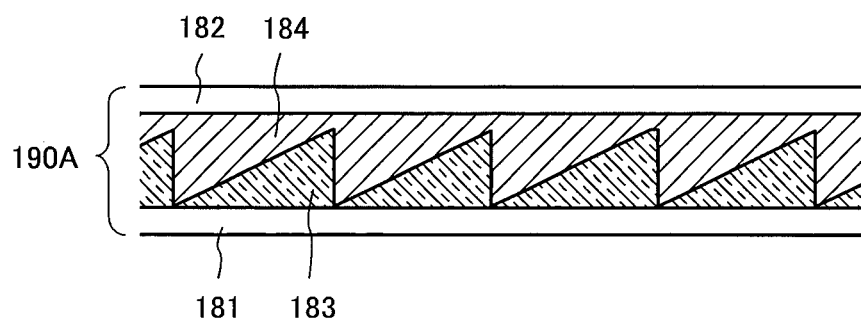
FIG. 16B is an example of the structure of a liquid crystal element.

FIG. 16A is the display device 100J according to an embodiment of the invention, and FIG. 16B is an example of the structure of the liquid crystal element 190. The display device 100J has the lighting device 110, the image display panel 120, the variable phase difference element 140, and the liquid crystal element 190A. Compared to the display device 100I, either the liquid crystal element 190A or the liquid crystal element 190B is omitted from the display device 100J. In FIG. 16A, an example is shown in which the liquid crystal element 190B is omitted from the display device 100J.

Table 6 shows the viewing angle directions corresponding to the on state or the off state of the variable phase difference element 140 in the display device 100J.

TABLE 6

| variable phase difference element | viewing angle direction |
|---|---|
| on state | first direction |
| off state | third direction |

The direction of polarized light can be changed in the display device 100J by switching the variable phase difference element 140 to the on state or the off state. When the variable phase difference element 140 is in the off state, the direction of light depends on the characteristics of the lighting device 110. Therefore, in the case of the lighting device 110 that emits light in the front direction, the light can be emitted in the first direction 201 (right side) or the second direction 202 (left side) and in the third direction 203 (front). For example, when used in an in-vehicle cluster, the screen direction can be controlled to the driver seat side and the passenger seat side.

The lighting device 110 is made to emit light in the oblique second direction 202, and the liquid crystal element 190A allows light to be emitted in the first direction 201. This allows light to be emitted on the right side when the variable phase difference element 140 is in the on state, and on the left side when it is in the off state. By synchronizing the switching between the image display panel 120 and the variable phase difference element 140 at high speed, it is possible to display different screens in the two directions.

Modification 9

Next, the display device 100K, which differs in some structures from the display device 100J, is described with reference to FIG. 17A and FIG. 17B.

Figure 17A:
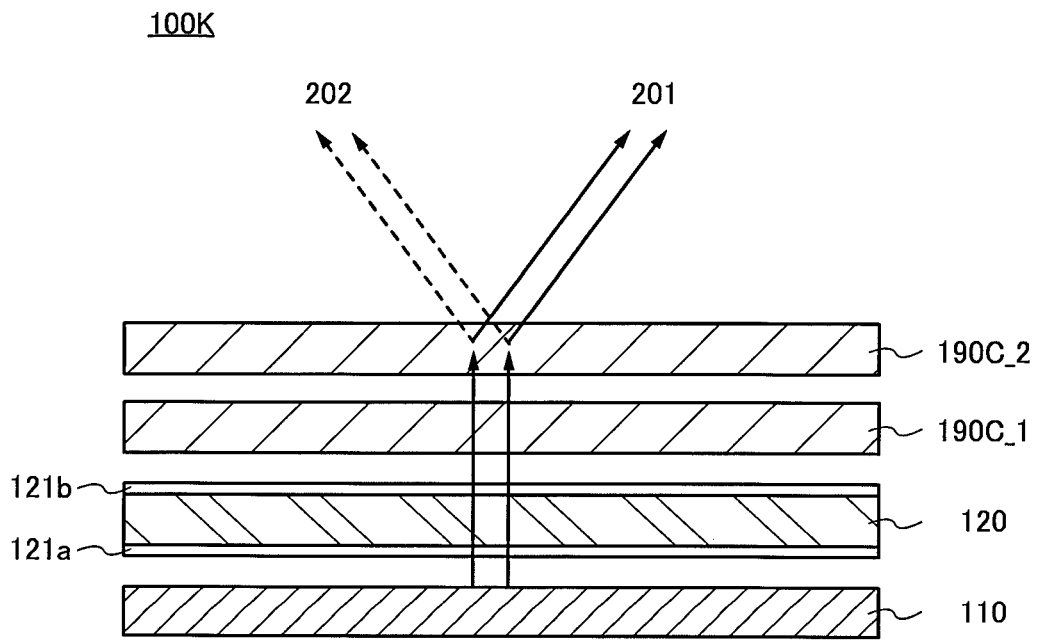
FIG. 17A is a cross-sectional view of a display device according to an embodiment of the present invention.
Figure 17B:
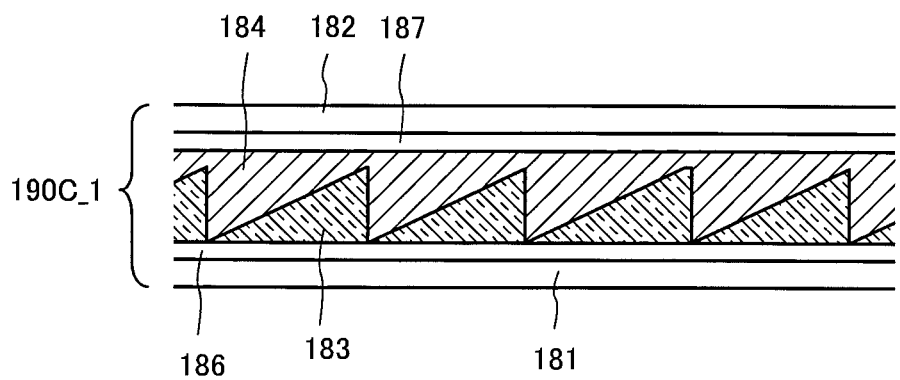
FIG. 17B is an example of the structure of a liquid crystal element.

FIG. 17A is the display device 100K according to an embodiment of the invention, and FIG. 17B is an example of the structure of the liquid crystal element 190. The display device 100K has the lighting device 110, the image display panel 120, and liquid crystal elements 190C_1 and 190C_2. Compared to the display device 100J, the variable phase difference element 140 is omitted from the display device 100K. In addition, the structure of the liquid crystal elements 190C_1 and 190C_2 is different from that of the liquid crystal elements 190A and 190B.

Here, the liquid crystal elements 190C_1 and 190C_2 have the same structure. Therefore, in FIG. 17B, only the structure of the liquid crystal element 190C_1 will be described. The liquid crystal element 190 has an electrode 186 on the substrate 181. An electrode 187 is arranged on the substrate 182, and a resin layer is arranged on the electrode 187. The substrate 181 and the substrate 182 face each other with the liquid crystal 183 in between.

By applying a voltage between the electrode 186 and the electrode 187, the liquid crystal changes from the horizontal direction to the vertical direction. At this time, the refractive index of the vertically oriented liquid crystal and the refractive index of the resin layer are made identical. For example, the refractive index of the resin layer is 1.5. The refractive index of the major axis of the liquid crystal molecules is 1.7, and the refractive index of the minor axis is 1.5. When the liquid crystal element 190C_1 is in the on state, the refractive indexes of the resin layer and the liquid crystal molecules are the same, so light is not bent. When the liquid crystal element 190C_1 is in the off state, the light is refracted because the refractive index of the liquid crystal molecules is higher than that of the resin layer. This allows the element to be active, capable of switching between a mode in which incident light is diffracted and a mode in which incident light is transmitted. The liquid crystal elements 190C_1 and 190C_2 orient the liquid crystal in the same direction. The direction in which the liquid crystal 183 is oriented is the same direction as the transmission axis of the polarizing plate.

Table 7 shows the viewing angle directions corresponding to the on state or the off state of liquid crystal elements 190C_1 and 190C_2 in the display device 100K.

TABLE 7

| liquid crystal element 190C_1 | liquid crystal element 190C_2 | variable phase difference |
|---|---|---|
| on state | off state | first direction |
| off state | on state | second direction |
| off state | off state | third direction |

Figure 18A:
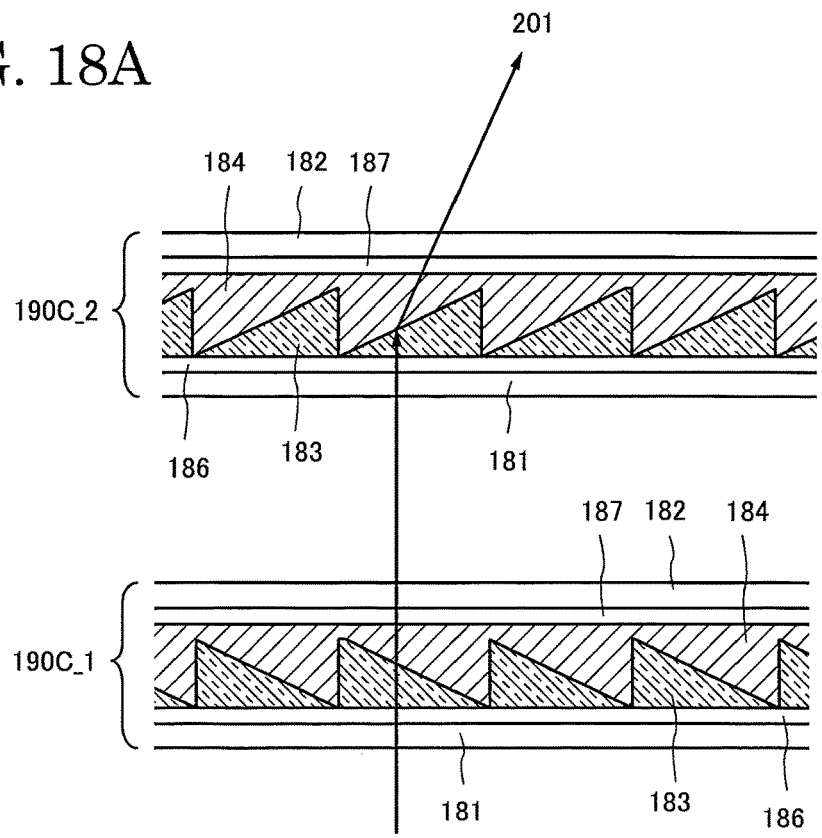
FIG. 18A is a diagram showing the direction of light emitted according to the orientation state of the liquid crystal in the liquid crystal element.
Figure 18B:
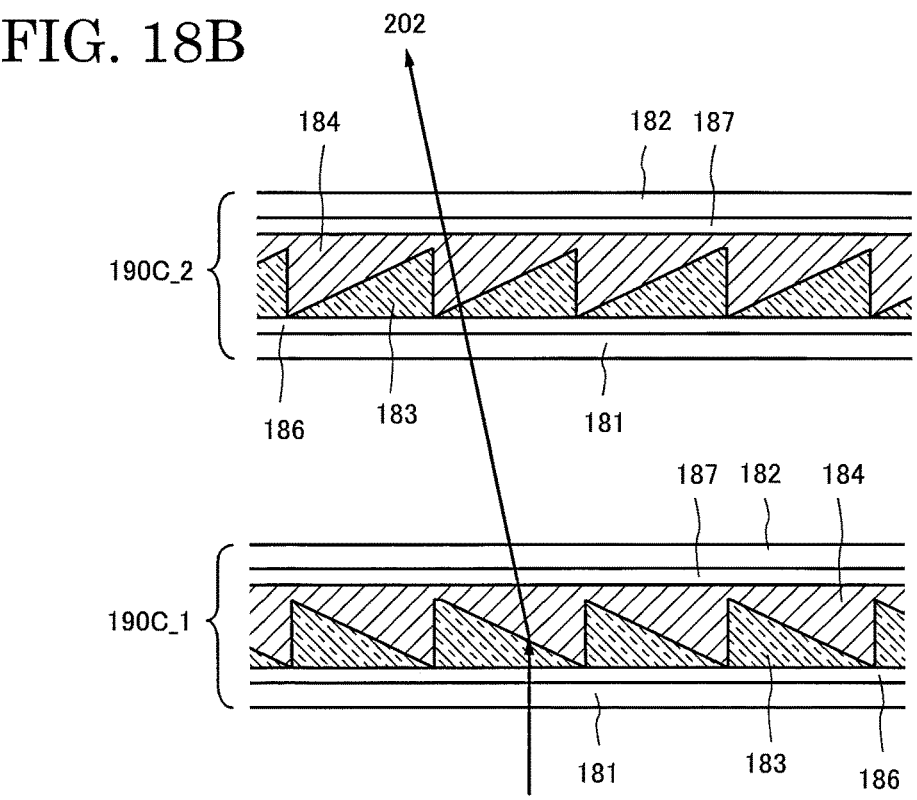
FIG. 18B is a diagram showing the direction of light emitted according to the orientation state of the liquid crystal in the liquid crystal element.

FIG. 18A and FIG. 18B show the direction of light emitted according to the orientation state of the liquid crystal in the liquid crystal elements. In the display device 100K, the case where the liquid crystal element 190C_1 is in the on state and the liquid crystal element 190C_2 is in the off state will be described. In this case, the liquid crystal of liquid crystal element 190C_1 changes from the horizontal to the vertical direction. As shown in FIG. 18A, light emitted from the image display panel 120 passes through the liquid crystal element 190C_1 and is refracted at the liquid crystal element 190C_2. As a result, light is emitted in the first direction 201 of the liquid crystal element 190C_2.

The following describes a case in which the liquid crystal element 190C_1 is in the off state and the liquid crystal element 190C_2 is in the on state in the display device 100K. In this case, the liquid crystal of the liquid crystal element 190C_2 changes from a horizontal to a vertical direction. As shown in FIG. 18B, light emitted from the image display panel 120 is refracted at the liquid crystal element 190C_1 and transmitted at the liquid crystal element 190C_2. As a result, light is emitted in the second direction 202 of the liquid crystal element 190C_2.

The case where the liquid crystal elements 190C_1 and 190C_2 are in the off state in the display device 100K will be described. In this case, the liquid crystal of the liquid crystal elements 190C_1 and 190_2 remain in the horizontal direction. As a result, light emitted from the image display panel 120 is refracted at the liquid crystal element 190C_1 and also at the liquid crystal element 190C_2. As a result, light is emitted in the center direction of the liquid crystal element 190C_2.

Modification 10

Next, the display device 100L, which differs in some structures from the display device 100J, is described with reference to FIG. 19A and FIG. 19B.

Figure 19A:
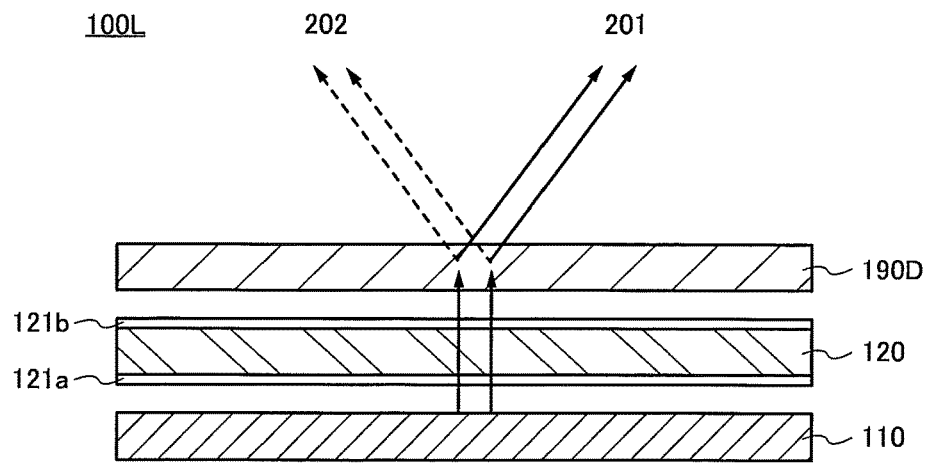
FIG. 19A is a cross-sectional view of a display device according to an embodiment of the present invention.
Figure 19B:
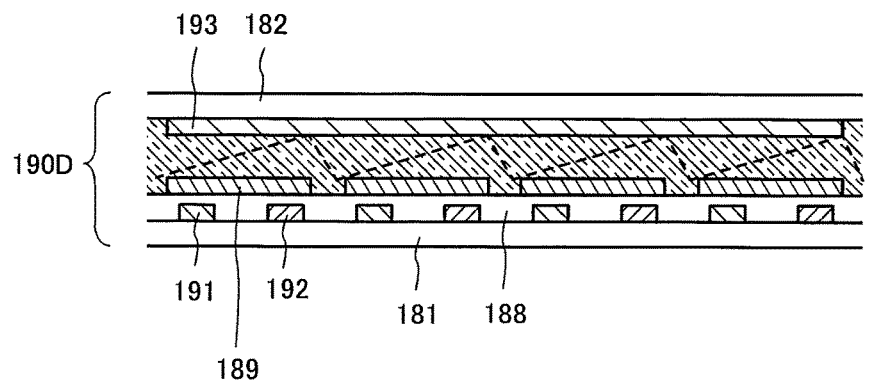
FIG. 19B is an example of the structure of a liquid crystal element.

FIG. 19A is the display device 100L according to an embodiment of the invention, and FIG. 19B is an example of the structure of a liquid crystal element 190D. The display device 100L has the lighting device 110, the image display panel 120, and the liquid crystal element 190D. Compared to the display device 100J, the variable phase difference element 140 is omitted from the display device 100L. In addition, the structure of the liquid crystal element 190D is different from that of the liquid crystal element 190A.

In the liquid crystal element 190D, electrodes 191 and 192 are arranged on the substrate 181. The electrode 191 is arranged separated from the electrode 192. An insulating film 188 is arranged on the electrodes 191 and 192. An insulating layer 189 is arranged on the insulating film 188. An electrode 193 is arranged on the substrate 182. The substrate 181 and the substrate 182 face each other with the liquid crystal 183 between them. The electrodes 191 and 192 are facing the electrode 193. The direction in which the liquid crystal 183 is oriented is the same as the transmission axis of the polarizing plate.

Table 8 shows the viewing angle directions corresponding to the relationship between the on state or the off state of the liquid crystal element 190D and the voltages V1, V2 and V3 in the display device 100L.

TABLE 8

| liquid crystal element | Voltage | viewing angle direction |
|---|---|---|
| on state | V1 = V2 = 0, V3 = 5 V | first direction |
| on state | V1 = V3 = 0, V2 = 5 V | second direction |
| off state | V1 = V2 = V3 = 0 | third direction |

Figure 19C:
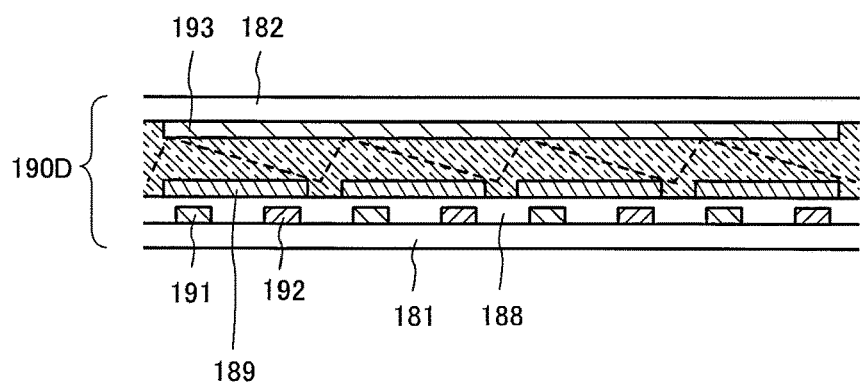
FIG. 19C is an example of the structure of a liquid crystal element.

The case where the voltage V1 of the electrode 191 is 0 V, the voltage V2 of the electrode 192 is 0 V, and the voltage V3 of the electrode 193 is 5 V will be described. In this case, the orientation of the liquid crystal becomes like a prism, as shown by the dotted line in FIG. 19B. Therefore, when light enters the liquid crystal element 190D, the light is refracted in the second direction 202. Next, the case where the voltage V1 of the electrode 191 is 0 V, the voltage V2 of the electrode 192 is 5 V, and the voltage V3 of the electrode 193 is 0 V will be described. In this case, the orientation of the liquid crystal becomes like a prism in the opposite direction from the dotted line shown in FIG. 19B, as shown in FIG. 19C. Therefore, when light enters the liquid crystal element 190D, the light is refracted in the first direction 201. When the voltage V1 of the electrode 191, the voltage V2 of the electrode 192, and the voltage V3 of the electrode 193 are all set to 0 V, the orientation of the liquid crystal remains horizontal to the substrates 181 and 182. Therefore, when light enters the liquid crystal element 190D, the light is emitted in the third direction 203.

Modification 11

Next, display devices 100M and 100N, which differ in some structures from the display device 100I, are described with reference to FIG. 20A and FIG. 20B.

In the display device 100I, the example of the liquid crystal elements 190A and 190B being arranged on the image display panel 120 will be described. The liquid crystal elements 190A and 190B may be arranged on the image display panel 120.

Figure 20A:
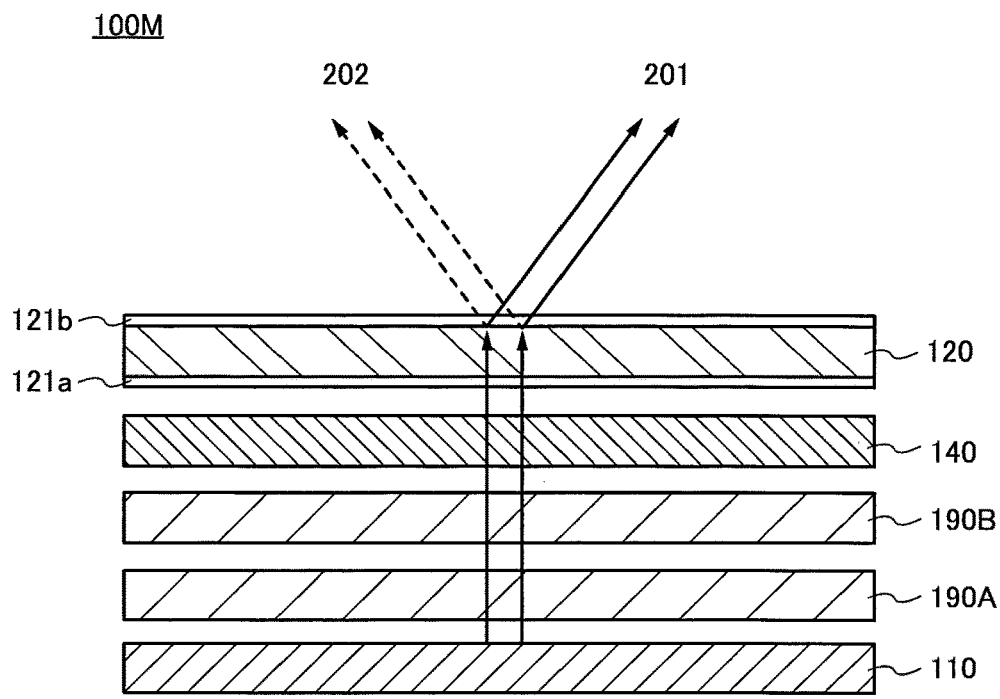
FIG. 20A is a cross-sectional view of a display device according to an embodiment of the present invention.

FIG. 20A is the display device 100M according to an embodiment of the present invention. The display device 100M has the lighting device 110, the liquid crystal element 190A, the liquid crystal element 190B, the variable phase difference element 140, and the image display panel 120. In the display device 100M, the lighting device 110, the liquid crystal element 190A, the liquid crystal element 190B, the variable phase difference element 140, and the image display panel 120 are stacked in order from the bottom. In the display device 100M, the relationship of the viewing angle direction corresponding to the on state, the off state, or the intermediate state of the variable phase difference element 140 is the same as in Table 5.

Figure 20B:
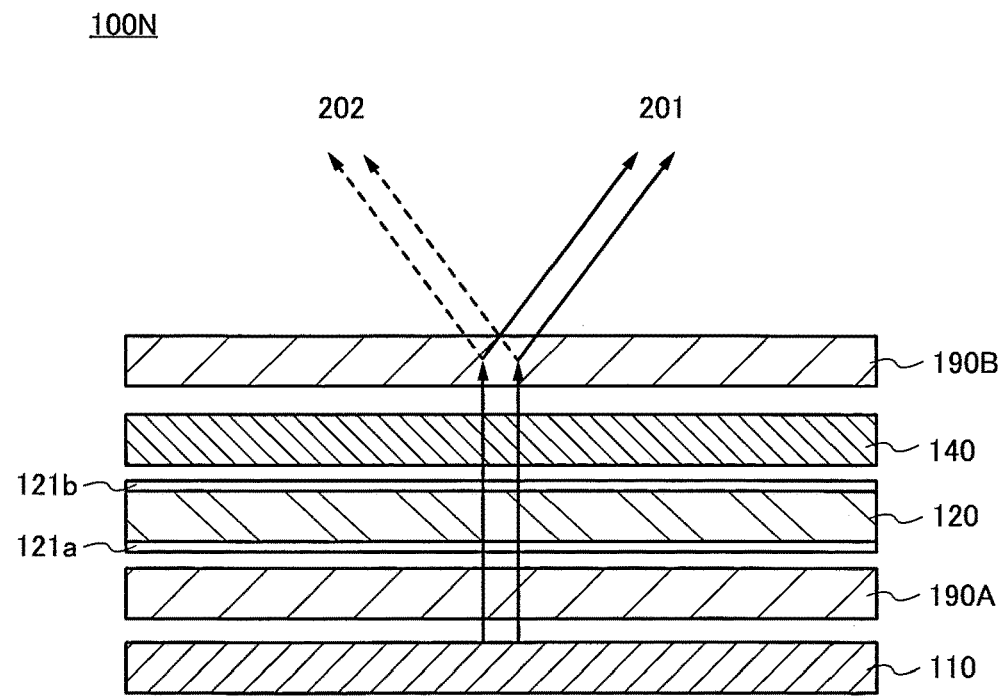
FIG. 20B is a cross-sectional view of a display device according to an embodiment of the present invention.

FIG. 20B is the display device 100N according to an embodiment of the invention. The display device 100N has the lighting device 110, the liquid crystal element 190A, the image display panel 120, the variable phase difference element 140, and the liquid crystal element 190B. In the display device 100N, the lighting device 110, the liquid crystal element 190A, the image display panel 120, the variable phase difference element 140, and the liquid crystal element 190B are stacked in order from the bottom. In the display device 100N, the relationship of the viewing angle direction corresponding to the on state, the off state, or the intermediate state of the variable phase difference element 140 is the same as in Table 5.

Within the scope of the idea of the present invention, those skilled in the art can arrive at to various examples of changes and modifications, and it is understood that such changes and modifications also fall within the scope of the present invention. For example, any addition, deletion, or design modification of components, or any addition, omission, or modification of conditions of a process, made by a person skilled in the art to any of the above embodiments, as appropriate, and are included in the scope of the invention as long as it has the gist of the invention.

In addition, other advantageous brought about by the mode in this embodiment that are obvious from the description herein or that can be conceived by those skilled in the art are naturally understood to be brought about by the present invention.

What is claimed is:

1. A display device comprising:
   a lighting device;
   a liquid crystal diffraction element arranged on the lighting device;
   a first retardation plate arranged on the liquid crystal diffraction element;
   a first variable phase difference element arranged on the first retardation plate to provide phase difference to an incoming light; and
   an image display panel arranged on the first variable phase difference element.

2. The display device according to claim 1, further comprising:
   a reflective polarizing film between the lighting device and the liquid crystal diffraction element.

3. The display device according to claim 1, further comprising:
   a reflective polarizing film, a second retardation plate, and a second variable phase difference element between the lighting device and the liquid crystal diffraction element.

4. The display device according to claim 1, wherein the liquid crystal diffraction element is switchable between an on state and an off state.

5. A display device comprising:
   an image display panel,
   a louver film arranged on the image display panel,
   a liquid crystal diffraction element arranged on the louver film,
   a first retardation plate arranged on the liquid crystal diffraction element, a variable phase difference element arranged on the first retardation plate to provide phase difference to an incoming light, and a first polarizing plate arranged on the image display panel.

6. The display device according to claim 5, further comprising:

a second retardation plate and a second polarizing plate between the image display panel and the louver film.

7. The display device according to claim 5, wherein the louver film is capable of controlling an emission angle of light exiting the louver film.

8. The display device according to claim 6, wherein the louver film is capable of controlling an emission angle of light exiting the louver film.

9. The display device according to claim 5, wherein the liquid crystal diffraction element is switchable between an on state and an off state.

* * * * *